(12) United States Patent
Matsumoto et al.

(10) Patent No.: US 8,064,897 B2
(45) Date of Patent: Nov. 22, 2011

(54) TRANSMITTING/RECEIVING APPARATUS AND TRANSMITTING/RECEIVING METHOD

(75) Inventors: Atsushi Matsumoto, Ishikawa (JP); Sadaki Futagi, Ishikawa (JP); Akihiko Nishio, Kanagawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 487 days.

(21) Appl. No.: 10/586,970

(22) PCT Filed: Jan. 27, 2005

(86) PCT No.: PCT/JP2005/001103
§ 371 (c)(1),
(2), (4) Date: Jul. 25, 2006

(87) PCT Pub. No.: WO2005/074178
PCT Pub. Date: Aug. 11, 2005

(65) Prior Publication Data
US 2007/0155323 A1 Jul. 5, 2007

(30) Foreign Application Priority Data

Jan. 29, 2004 (JP) .................................. 2004-021198
Jan. 26, 2005 (JP) .................................. 2005-018149

(51) Int. Cl.
*H04W 24/00* (2009.01)
(52) U.S. Cl. ........ 455/423; 455/303; 455/453; 370/232; 370/343; 370/431; 370/436
(58) Field of Classification Search ................. 455/303, 455/453, 423; 370/232, 343, 431, 436
See application file for complete search history.

(56) References Cited

U.S. PATENT DOCUMENTS

| 5,726,978 | A  | * | 3/1998 | Frodigh et al. |
| 6,882,850 | B2 | * | 4/2005 | McConnell et al. .......... 455/453 |
| 6,993,294 | B2 | * | 1/2006 | Nobukiyo et al. |
| 7,020,110 | B2 | * | 3/2006 | Walton et al. ................. 370/334 |

(Continued)

FOREIGN PATENT DOCUMENTS

JP    11027231    *    1/1999

(Continued)

OTHER PUBLICATIONS

PCT International Search Report dated May 17, 2005.*
Y. Hara, et al.; "MC-CDM System for Packet Communications Using Frequency Scheduling," The Institute of Electronics, Information and Communication Engineers, Technical Report of IEICE, NS2002-101 RCS2002-129, Jul. 2002, pp. 61-66.*

*Primary Examiner* — Lester Kincaid
*Assistant Examiner* — Isaak R Jama
(74) *Attorney, Agent, or Firm* — Dickinson Wright PLLC

(57) ABSTRACT

A transmission/reception apparatus capable of preventing degradation in system capacity, improving system throughput, and minimizing power consumption of an apparatus is disclosed. In this apparatus, a propagation path determining section (131) determines a propagation path state in all the regions in the used frequency band of a received multicarrier signal based on propagation path estimation information such as a channel estimation value and the like calculated in a propagation path estimating section (126), and specifies a frequency region having a good propagation path state from the used frequency band of OFDM. More specifically, the used frequency band is divided into a plurality of frequency bands (subbands), each comprised of smaller predetermined bandwidth, and by selecting a subband having a good propagation path state in the propagation path determining section (131), a frequency region having the good propagation path state is specified. A transmitting section (110) reports the subband information to a base station.

8 Claims, 29 Drawing Sheets

U.S. PATENT DOCUMENTS

| | | | |
|---|---|---|---|
| 7,050,395 B1 * | 5/2006 | Chow et al. | 370/231 |
| 7,079,859 B2 * | 7/2006 | Nobukiyo et al. | 455/522 |
| 7,206,350 B2 * | 4/2007 | Korobkov et al. | 375/260 |
| 7,263,084 B2 * | 8/2007 | Miyoshi | 370/335 |
| 7,295,517 B2 * | 11/2007 | Anim-Appiah et al. | 370/232 |
| 7,372,889 B2 * | 5/2008 | Atarashi et al. | 375/130 |
| 7,433,309 B2 * | 10/2008 | Rue | 370/232 |
| 2001/0024427 A1 * | 9/2001 | Suzuki | |
| 2002/0137519 A1 * | 9/2002 | Miyoshi et al. | |
| 2003/0009717 A1 * | 1/2003 | Fukushima et al. | |
| 2003/0054829 A1 * | 3/2003 | Moisio | 455/452 |
| 2003/0189917 A1 * | 10/2003 | Sudo | 370/347 |
| 2004/0005882 A1 * | 1/2004 | Yoshii | |
| 2004/0233838 A1 * | 11/2004 | Sudo et al. | 370/208 |
| 2004/0235485 A1 * | 11/2004 | Tanaka | 455/447 |
| 2005/0063378 A1 * | 3/2005 | Kadous | 370/389 |
| 2005/0096089 A1 * | 5/2005 | Ishii et al. | 455/561 |

FOREIGN PATENT DOCUMENTS

| | | | |
|---|---|---|---|
| JP | 11055206 | * | 2/1999 |
| JP | 11145929 | * | 5/1999 |
| JP | 11508417 | * | 7/1999 |
| JP | 2001148678 | * | 5/2001 |
| JP | 2001235335 | * | 8/2001 |
| JP | 2001238269 | * | 8/2001 |
| JP | 2002084577 | * | 3/2002 |
| JP | 2002252619 | * | 6/2002 |
| JP | 2003018079 | * | 1/2003 |
| JP | 2003199173 | * | 7/2003 |
| JP | 2003324496 | * | 11/2003 |

* cited by examiner

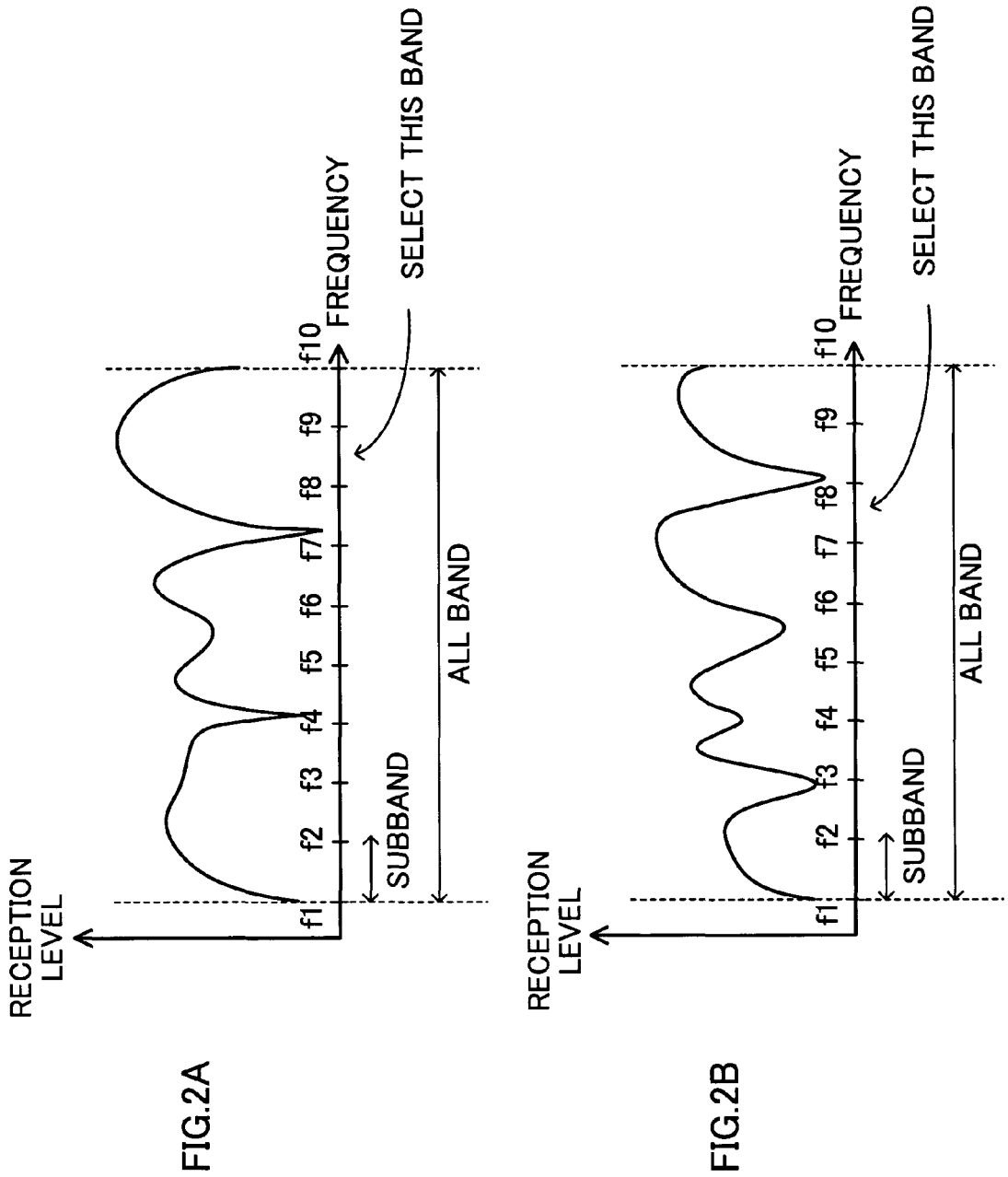

|  | FIRST PRIORITY | SECOND PRIORITY |
|---|---|---|
| ACK | 1, 1 | 1, −1 |
| NACK | −1, 1 | −1, −1 |

FIG.15

TRANSMITTING/RECEIVING APPARATUS AND TRANSMITTING/RECEIVING METHOD

TECHNICAL FIELD

The present invention relates to a transmission/reception apparatus and a transmission/reception method used in OFDMA (Orthogonal Frequency Division Multiple Access) scheme communication systems.

BACKGROUND ART

In recent years, OFDMA scheme communication systems have been attracting attention, in which, in order to increase communication system throughput, data is mapped on sub-carrier signals (carriers) orthogonal to one another on the frequency axis, and the signals are multiplexed (as multicarrier) and transmitted. In particular, in order to enable more efficient communication, not only (temporal) scheduling assigning a transmission packet preferentially to a mobile station apparatus having a good propagation path state, but also, with attention to a frequency direction, frequency scheduling technique assigning a transmission packet preferentially to a subcarrier having a good propagation path state have been actively studied (for example, see Patent Document 1 and Non-patent Document 1).

In this frequency scheduling technique, upon scheduling, a base station needs to know in advance the propagation path state(frequency characteristics) between the base station and a mobile station apparatus in order to assign transmission packets. Therefore, in an OFDMA-FDD (Frequency Division Duplex) system, the mobile station apparatus measures a propagation path state in a used downlink frequency band and reports the measurement result to the base station on uplink, and based on the information, the base station performs transmission packet scheduling. Further, in an OFDMA-TDD (Time Division Duplex) system, not onlyamethod of reporting information regarding a downlink propagation path state from a mobile station apparatus like an FDD system, but also a method of performing downlink scheduling based on uplink propagation path state using uplink/downlink symmetric property have been studied.

In addition, as a similar technique to report downlink information to a base station by a mobile station apparatus, there is an HSDPA (High Speed Downlink Packet Access) scheme. In this scheme, based on downlink reception quality information reported from a mobile station apparatus, a base station determines a modulation scheme of a signal to be transmitted to this mobile station apparatus (for example, see Patent Document 2).

Patent Document 1: Japanese Patent Application Laid-Open No. 2002-252619 (p. 5-6)
Patent Document 2: Japanese Patent Application Laid-Open No. 2003-199173 (p. 8, FIG. 5)
Non-patent Document 1: "MC-CDMA scheme using frequency scheduling", Technical Report of IEICE, RCS2002-129, July 2002, p. 61-66

DISCLOSURE OF INVENTION

Problems to be Solved by the Invention

However, like in the above-mentioned OFDMA-FDD system, in the case where a mobile station apparatus reports a downlink propagation path state to a base station on uplink, information indicating the propagation path state is transmitted on uplink and consumes resources on uplink. There is therefore a problem that system capacity decreases. In this case, since the base station cannot extract the information unless the signal on uplink is decoded, the processing delay occurs, and overall system throughput deteriorates.

Also, in the case of using uplink/downlink reversibility of the propagation path like the above OFDMA-TDD system, a mobile station apparatus needs to transmit symbols such as pilot signals and the like to all regions in a frequency band where scheduling is possible, and resources on uplink are consumed. There is therefore a problem that system capacity decreases. Further, in this case, power consumption increases in the mobile station apparatus.

In addition, for the purposes of increasing uplink throughput, and reducing power consumption in a mobile station apparatus and the like, the above-mentioned Patent Document 2 discloses a mobile station apparatus which starts transmitting information on reception quality to a base station upon receiving an advance report for data transmission from the base station, and stops the information transmission upon receiving a completion report for data transmission from the base station. However, since the base station needs to transmit the advance report for data transmission to the mobile station apparatus, resources on downlink are consumed, and there is, again, a problem that system capacity decreases.

It is therefore an object of the present invention to provide a transmission/reception apparatus and a transmission/reception method capable of preventing reduction in system capacity, improving system throughput, and minimizing power consumption.

Means for Solving the Problem

A reception apparatus of the present invention employs a configuration providing: a determination section that makes a determination of a propagation path state through which a received multicarrier signal is transmitted; a specifying section that specifies a region having a propagation path state that is equal to or better than a predetermined level in a frequency band used for the received multicarrier signal, according to the determination result; and a reporting section that reports region information indicating the specified region to a transmission apparatus.

According to this configuration, within a used frequency band, only a region having a good propagation path state is reported to the transmission side, so that it is possible to reduce data amount and improve communication system throughput. Further, power consumption can be reduced in the reception apparatus.

Advantageous Effect of the Invention

According to the present invention, it is possible to prevent reduction in system capacity, improve system throughput, and reduce power consumption in the transmission/reception apparatus.

BRIEF DESCRIPTION OF DRAWINGS

FIG. 2A is a graph showing subbands selected by a propagation path determining section according to Embodiment 1, together with a downlink propagation path state;

FIG. 2B is another graph showing subbands selected by the propagation path determining section according to Embodiment 1, together with a downlink propagation path state;

FIG. 15 is a table showing an example of pilot patterns selected in a pilot selecting section according to Embodiment 2;

BEST MODE FOR CARRYING OUT THE INVENTION

Embodiments of the present invention will be described below in detail with reference to the accompanying drawings. Here, as a transmission/reception apparatus, a base station apparatus and a mobile station apparatus in an OFDMA-TDD scheme mobile communication system will be explained as examples. Further, assume that this communication system performs ARQ (Automatic Repeat reQuest).

Embodiment 1

Figure 1:
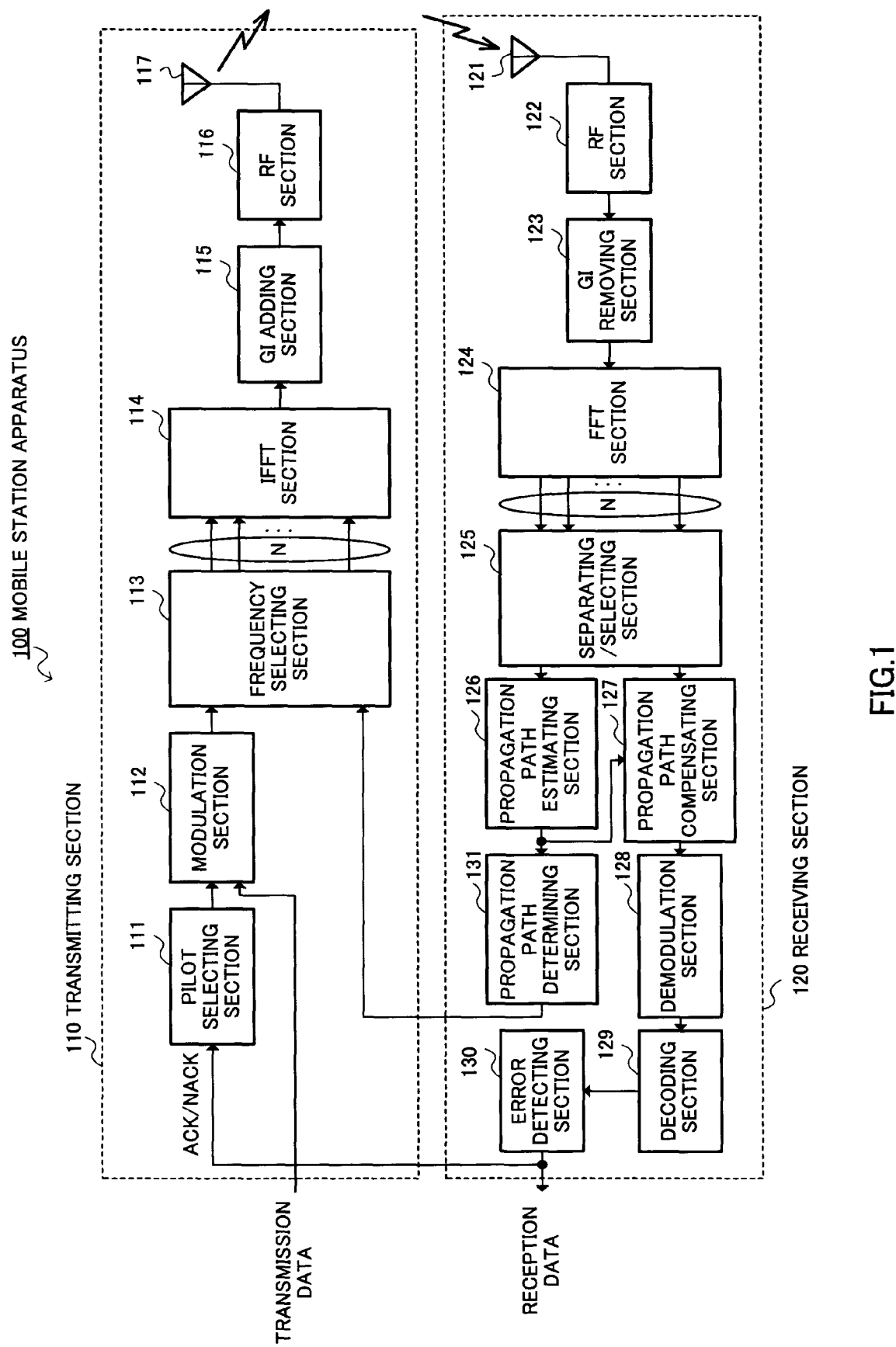
FIG. 1 is a block diagram illustrating a primary configuration of a mobile station apparatus according to Embodiment 1.

FIG. 1 is a block diagram illustrating a primary configuration of mobile station apparatus 100 according to Embodiment 1 of the present invention.

Mobile station apparatus 100 has transmitting section 110 and receiving section 120. Transmitting section 110 has pilot selecting section 111, modulation section 112, frequency selecting section 113, IFFT section 114, GI adding section 115, RF section 116 and transmission antenna 117. Receiving section 120 has reception antenna 121, RF section 122, GI removing section 123, FFT section 124, separating/selecting section 125, propagation path estimating section 126, propagation path compensating section 127, demodulation section 128, decoding section 129, error detecting section 130 and propagation path determining section 131.

The sections of mobile station apparatus 100 perform the following operations.

In receiving section 120, RF section 122 performs predetermined radio reception processing such as down-conversion and the like on a downlink multicarrier signal received via reception antenna 121. GI removing section 123 removes a guard interval (GI) from the multicarrier signal subjected to the radio reception processing. FFT section 124 performs fast Fourier transform (FFT) on the GI-removed multicarrier signal and obtains N signals. Separating/selecting section 125 separates pilot signals and data signals from N signals, selects data for mobile station apparatus 100 from the data signals, outputs the pilot signals to propagation path estimating section 126, and further outputs the data signals for mobile station apparatus 100 to propagation path compensating section 127. Propagation path estimating section 126 estimates, from the pilot signal multiplexed on the reception signal, propagation path fluctuations which the reception signal had on the propagation path for all bands in used OFDM frequencies, and outputs obtained propagation path estimation information such as a channel estimation value and the like to propagation path compensating section 127 and propagation path determining section 131. Using this channel estimation value, propagation path compensating section 127 compensates for the propagation path of the reception signal output from separating/selecting section 125. Demodulation section 128 performs demodulation processing on the reception signal subjected to propagation path compensation. Decoding section 129 decodes the demodulated signal and obtains received data. Error detecting section 130 performs error detection of the received data, and outputs ACK/NACK information to pilot selecting section 111 to send a detection result back to the base station apparatus. Propagation path determining section 131 determines a propagation path state using the channel estimation value output from propagation path estimating section 126, and outputs the determination result to frequency selecting section 113 in transmitting section 110.

In transmitting section 110, pilot selecting section 111 selects a pattern corresponding to the ACK/NACK information output from error detecting section 130 in receiving section 120 among a plurality of kinds of preliminary stored pilot signal patterns (pilot patterns), and generates a pilot signal comprised of this pattern. Modulation section 112 performs modulation processing on the pilot signal. According to the determination result of propagation path determining section 131 in receiving section 120, frequency selecting section 113 selects frequency bands that transmission signals use, and maps the transmission signals on subcarriers in the frequency bands. IFFT section 114 performs inverse fast Fourier transform (IFFT) on the transmission signals assigned to the frequency bands and generate a multicarrier signal. GI adding section 115 adds a GI to the obtained multicarrier signal. RF section 116 performs predetermined radio transmission processing such as up-conversion and the like on the transmission multicarrier signal added the GI, and transmits the signal as a radio signal via transmission antenna 117.

Features of mobile station apparatus 100 having the above-mentioned configuration are particularly the operations in propagation path determining section 131 in receiving section 120 and frequency selecting section 113 in transmitting section 110. Each of the operations will be described in detail below.

Based on the propagation path estimation information such as a channel estimation value and the like calculated in propagation path estimating section 126, propagation path determining section 131 determines a propagation path state in all regions in a used frequency band of the received multicarrier signal—that is, the propagation path state of all the regions in the used frequency band of OFDM. Then, propagation path estimating section 131 specifies a frequency region having the best propagation path state in the used OFDM frequency band.

More specifically, the used OFDM frequency band is divided into a plurality of frequency bands (subbands) containing predetermined smaller bandwidths, each subband being given information (for example, identification number) to identify the bands. Propagation path determining section 131 compares propagation path states per subband, selects a subband (one subband in this Embodiment) having the best propagation path state, and thereby specifies a frequency region having a good propagation path state.

FIGS. 2A and 2B are graphs showing subbands selected by propagation path determining section 131, together with the downlink propagation path state. In addition, FIG. 2A shows a case of user #1, and FIG. 2B shows a case of user #2. Further, for the sake of clarity, propagation path states are represented by reception levels of reception signals of the mobile station apparatuses, instead of channel estimation values.

As shown in these figures, the propagation path states (reception level) of the multicarrier signals received by mobile station apparatus 100 owned by the users #1 and #2 vary greatly with frequencies due to influences such as frequency selective fading and the like. Therefore, propagation path determining section 131 compares the propagation path states per subband, and selects a subband having the best propagation path state. In the example shown in the figures, the subband in a frequency f8 to f9 is selected for the case of user #1, and the subband in a frequency f7 to f8 is selected for the case of user #2. When the base station apparatus performs downlink communication with users (mobile station apparatus 100 owned by the users) via these subbands, influences of frequency selective fading and the like is not significant. Therefore, it is expected that a fluctuation becomes small and a reception state on the user side improves. After determination is completed, propagation path determining section 131 reports the determination result (subband selection information) to frequency selecting section 113 in transmitting section 110.

To report the subband selection information acquired from propagation path determining section 131 to the base station apparatus, frequency selecting section 113 transmits a specific report signal via the subband selected by propagation path determining section 131. The base station apparatus receives the report signal transmitted from the mobile station apparatuses, identifies subbands used for the report signal, and thereby knows subbands having good propagation path states of the mobile station apparatuses.

Further, in this Embodiment, since automatic repeat request is performed, frequency selecting section 113 uses an ACK/NACK signal as the above-mentioned report signal. In other words, the ACK/NACK signal has two roles of reporting necessity of retransmission in automatic repeat request to the base station apparatus, and of reporting a subband having a good propagation path state to the base station apparatus. In this Embodiment, since only one subband having the best propagation path state is reported to the base station apparatus, only one report signal is required. Accordingly, likewise, by only one transmitted ACK/NACK signal, the selected subband can be reported.

Figure 3A:
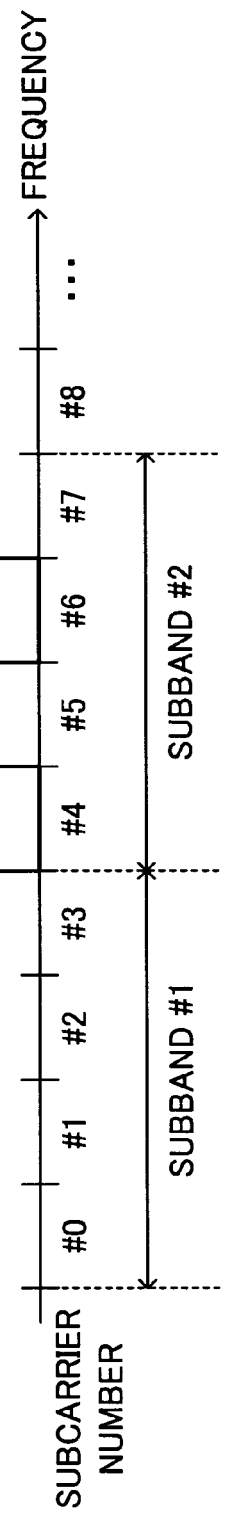
FIG. 3A is a signal configuration diagram showing the relationship between subbands and subcarrier signals.
Figure 3B:
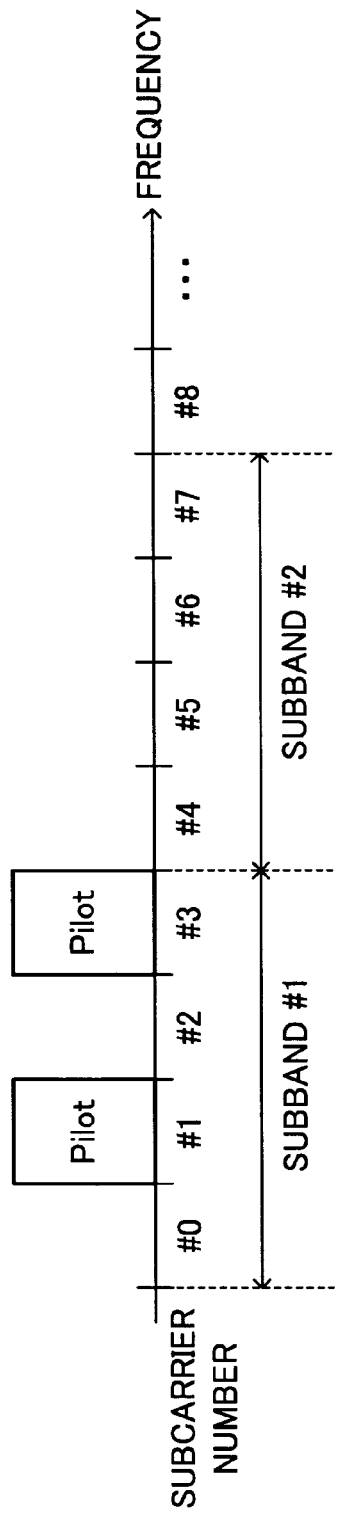
FIG. 3B is another signal configuration diagram showing the relationship between subbands and subcarrier signals.

FIGS. 3A and 3B are signal configuration diagrams each showing the relationship between subbands and subcarrier signals. In addition, shown herein is a case of two users, and FIG. 3A is a signal configuration diagram of user #1, and FIG. 3B is a signal configuration diagram of user #2.

As described previously, each subband has a predetermined bandwidth, and a plurality of subcarriers (four subcarriers in examples shown in the figures) can be allocated therein. FIG. 3A shows a state in which user #1 selects subband #2.

Then, user #1 transmits an ACK/NACK signal using subcarriers in subband #2 (here, subcarriers with subcarrier numbers #4 and #6). Meanwhile, user #2 in FIG. 3B selects subband #1, and therefore, transmits an ACK/NACK signal using the subcarriers in subband #1 (here, subcarriers #1 and #3).

The ACK/NACK signal is transmitted by a plurality of subcarriers (for example, subcarriers #4 and #6 in FIG. 3A). The base station apparatus thus combines a plurality of ACK/NACK signals transmitted from the mobile station apparatuses, and can thereby determine ACK and NACK. By this means, it is possible to determine ACK and NACK accurately.

Further, the ACK and NACK signals are identified by the pilot pattern of a pilot (known) signal. In other words, different pilot patterns are used for the ACK signal or NACK signal, and by this means, the base station apparatus can identify ACK/NACK.

Figure 4:
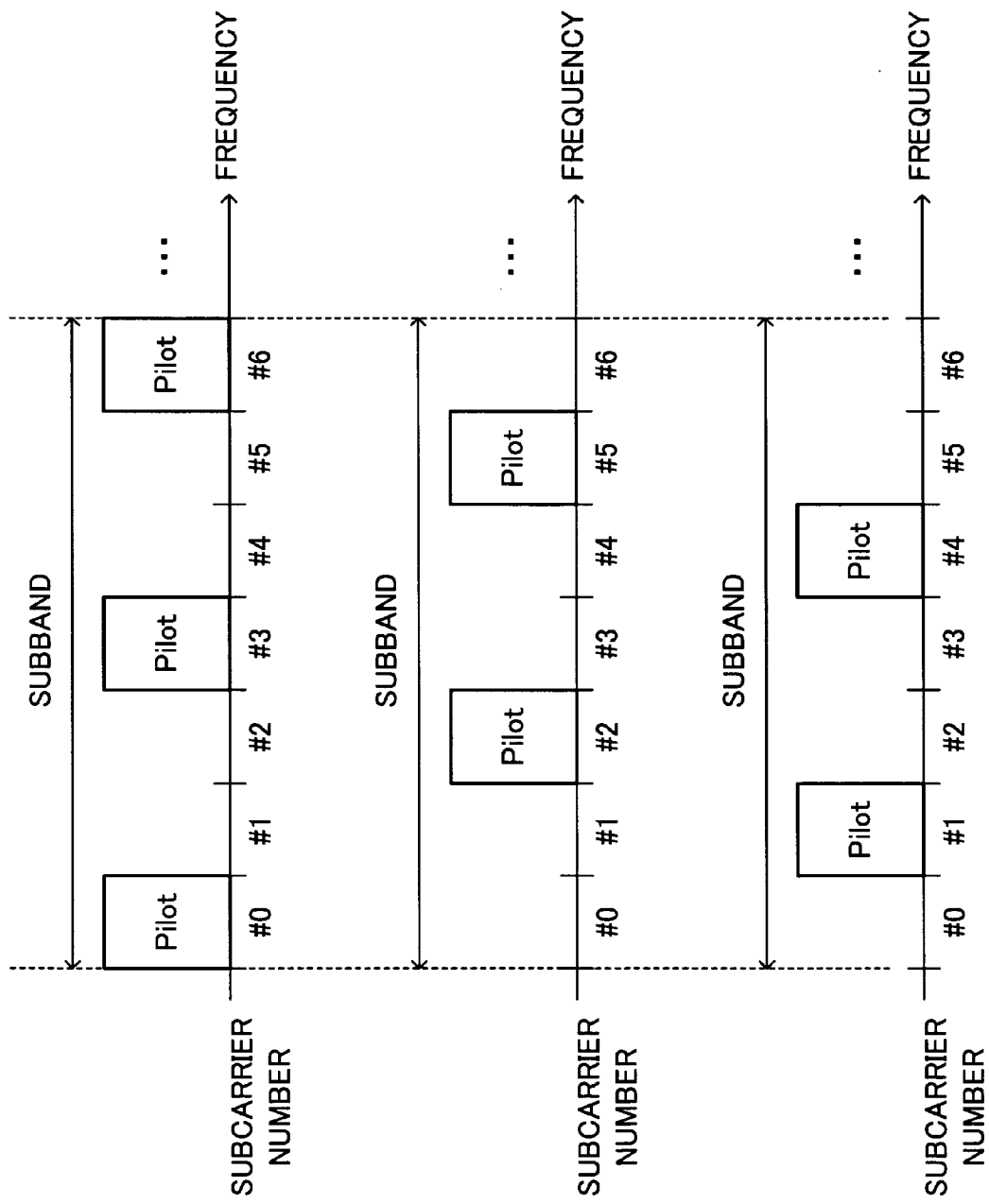
FIG. 4 is a diagram showing a subcarrier signal configuration in a single subband in more detail.

FIG. 4 is a diagram showing a more detailed configuration of subcarrier signals in a single subband. In addition, the top in FIG. 4 shows the case of user #1, the middle in FIG. 4 shows the case of user #2, and the bottom in FIG. 4 shows the case of user #3.

In the communication system according to this Embodiment, subcarriers are fixed and assigned to respective users. More specifically, user #1 is always assigned subcarriers with subcarrier numbers #0, #3 and #6 (see the top in FIG. 4), user #2 is always assigned subcarriers with subcarrier numbers #2 and #5 (see the middle in FIG. 4), and user #3 is always assigned subcarriers with subcarrier numbers #1 and #4 (see the bottom in FIG. 4). By employing such a signal configuration, even when a plurality of users use the same subband, a plurality of signals can be multiplexed in the same subband without interfering with one another.

Further, if the base station apparatus preliminarily knows how subcarriers are assigned to respective users, only by searching status of subcarrier use, the base station apparatus can recognize two information—that is, which user transmits a report signal and which subband the user selects.

In addition, when mobile station apparatus 100 has data to transmit on uplink, it transmits the data after the ACK/NACK signal as the above-mentioned report signal. By this means, a pilot sequence of the ACK/NACK signal also plays a role as a pilot for transmission data. It is thereby possible to transmit data more efficiently.

Figure 5:
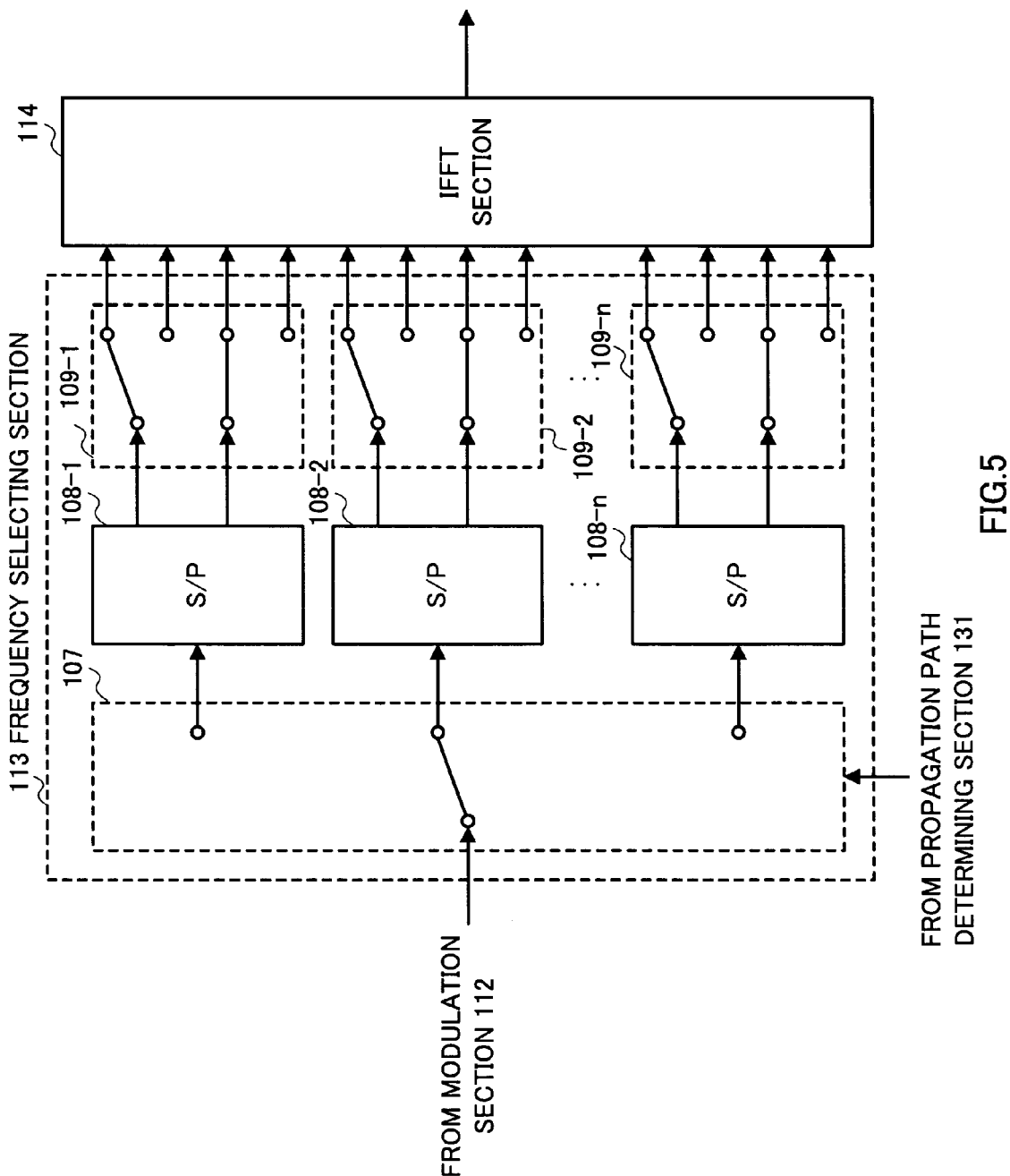
FIG. 5 is a block diagram illustrating a detailed internal configuration of a frequency selecting section according to Embodiment 1.

FIG. 5 is a block diagram illustrating a detailed internal configuration of frequency selecting section 113.

Frequency selecting section 113 has switch 107 to switch between subbands to be used, S/P conversion section 108 (108-1, 108-2, . . . , 108-n)) and switches 109 (109-1, 109-2, . . . , 109-n) to switch between subcarriers to be used.

Switch 107 selects a subband to use for the ACK/NACK signal based on the determination result (subband information) in propagation path determining section 131. More specifically, the ACK/NACK signal output from modulation section 112 is output via an output terminal switched corresponding to the selected subband.

S/P conversion sections 108 installed corresponding to subbands divide the ACK/NACK signals per subband output from switch 107 into a plurality of subcarrier signals by performing S/P conversion, and output the plurality of subcarrier signals to switches 109 installed corresponding to S/P conversion sections 108.

Switches 109 select subcarriers respectively assigned to users in the subbnands. More specifically, switches 109 output the ACK/NACK signals output from S/P conversion section 108 via an output terminal switched corresponding to the selected subcarrier. The ACK/NACK signals output from output terminals are input to IFFT section 114.

The above is an explanation of mobile station apparatus 100 according to this Embodiment. Next, a communication system having mobile station apparatus 100 and base station apparatus 150 accommodating mobile station apparatus 100 will be described.

Figure 6:
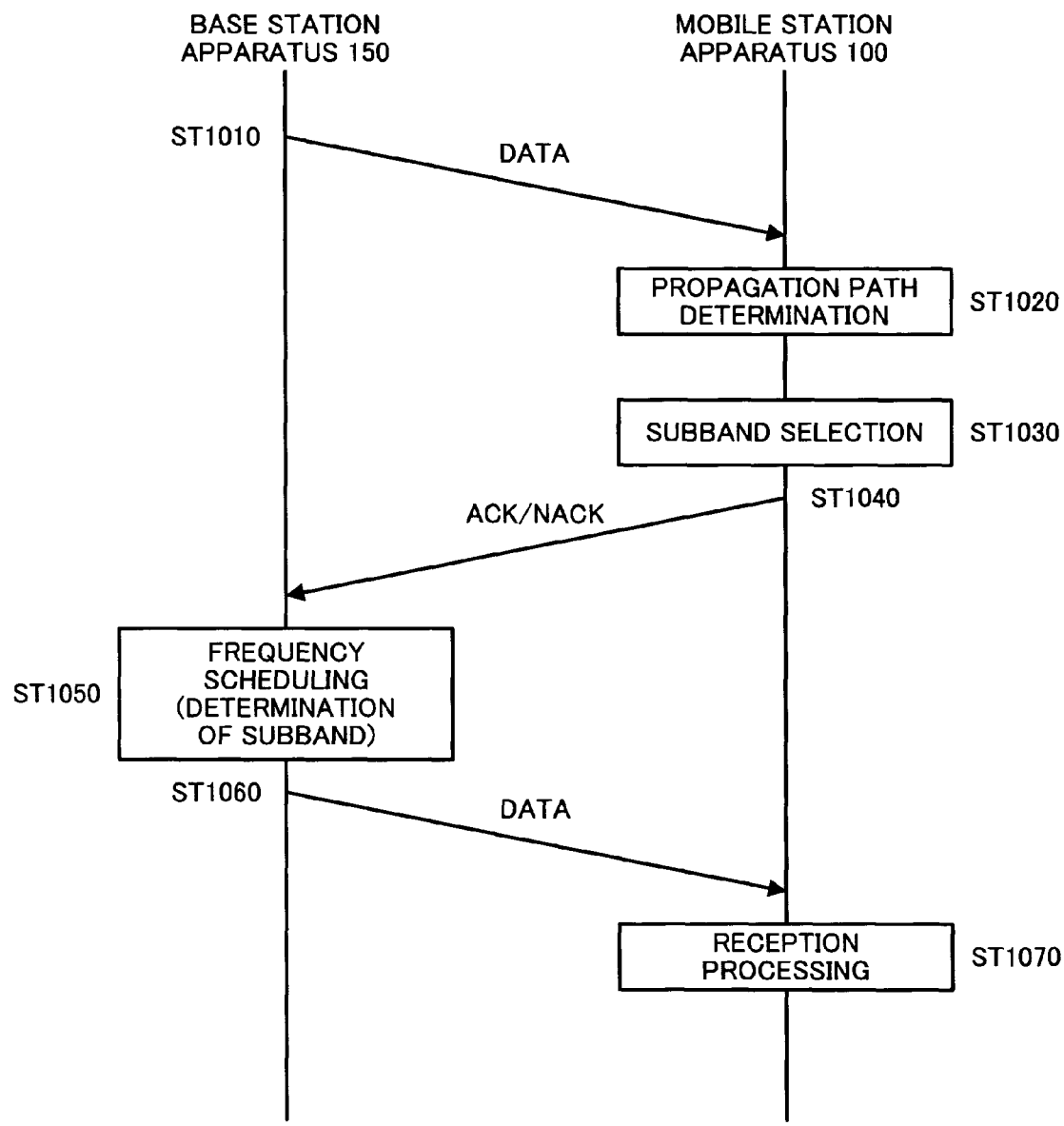
FIG. 6 is a diagram showing a signal sequence in a communication system according to Embodiment 1.

FIG. 6 is a diagram showing a signal sequence in the communication system according to this Embodiment.

Base station apparatus 150 transmits data for mobile station apparatus (ST1010). Mobile station apparatus 100 receives the signal, and as described previously, determines the propagation path state by performing an estimation of the propagation path fluctuation or the like (ST1020). Then, the apparatus 100 selects a subband having a good propagation state (ST1030), transmits an ACK/NACK signal (ST1040) using this subband, and thereby reports the selected subband to base station apparatus 150. Based on the subband information reported from the mobile station apparatuses by the ACK/NACK signals, base station apparatus 150 determines subbands to be assigned to the mobile station apparatuses, performs scheduling in the time-axis direction, and determines transmission schedule in the end (ST1050). Then, according to this scheduling, base station apparatus 150 transmits data (ST1060). Mobile station apparatus 100 performs a predetermined radio reception processing on the data subjected to frequency scheduling and transmitted from base station apparatus 150, and obtains the data to mobile station apparatus 100 (ST1070). In addition, the radio reception processing in mobile station apparatus 100 is performed only on the limited subbands previously reported to base station apparatus 150 (for the entire range of the reported subband).

This communication system is an asymmetric system with respect to uplink and downlink (the number of subcarrier is different between uplink and downlink.) By employing such a configuration, the number of subcarriers decreases on uplink, it is therefore possible to reduce PAPR (Peak Average Power Ratio)—that is, to minimize peak power—, and also reduce interferences between subcarriers. Accordingly, power consumption is reduced in mobile station apparatus 100, and the reception quality is improved.

In addition, mobile station apparatus 100 cannot make the above-mentioned propagation path determination until it receives a signal from base station apparatus 150, and therefore, base station apparatus 150 is assumed to transmit, on a regular basis, a dummy signal, pilot signal or synchronization signal required for each mobile station apparatus to establish communication with base station apparatus 150. In this way, even when mobile station apparatus 100 first transmits data, mobile station apparatus 100 can make the above-mentioned propagation path determination. In addition, base station apparatus 150 may use a predetermined subband to perform first data transmission, without transmitting dummy signals.

Next, base station apparatus 150 according to this Embodiment will be described below.

Figure 7:
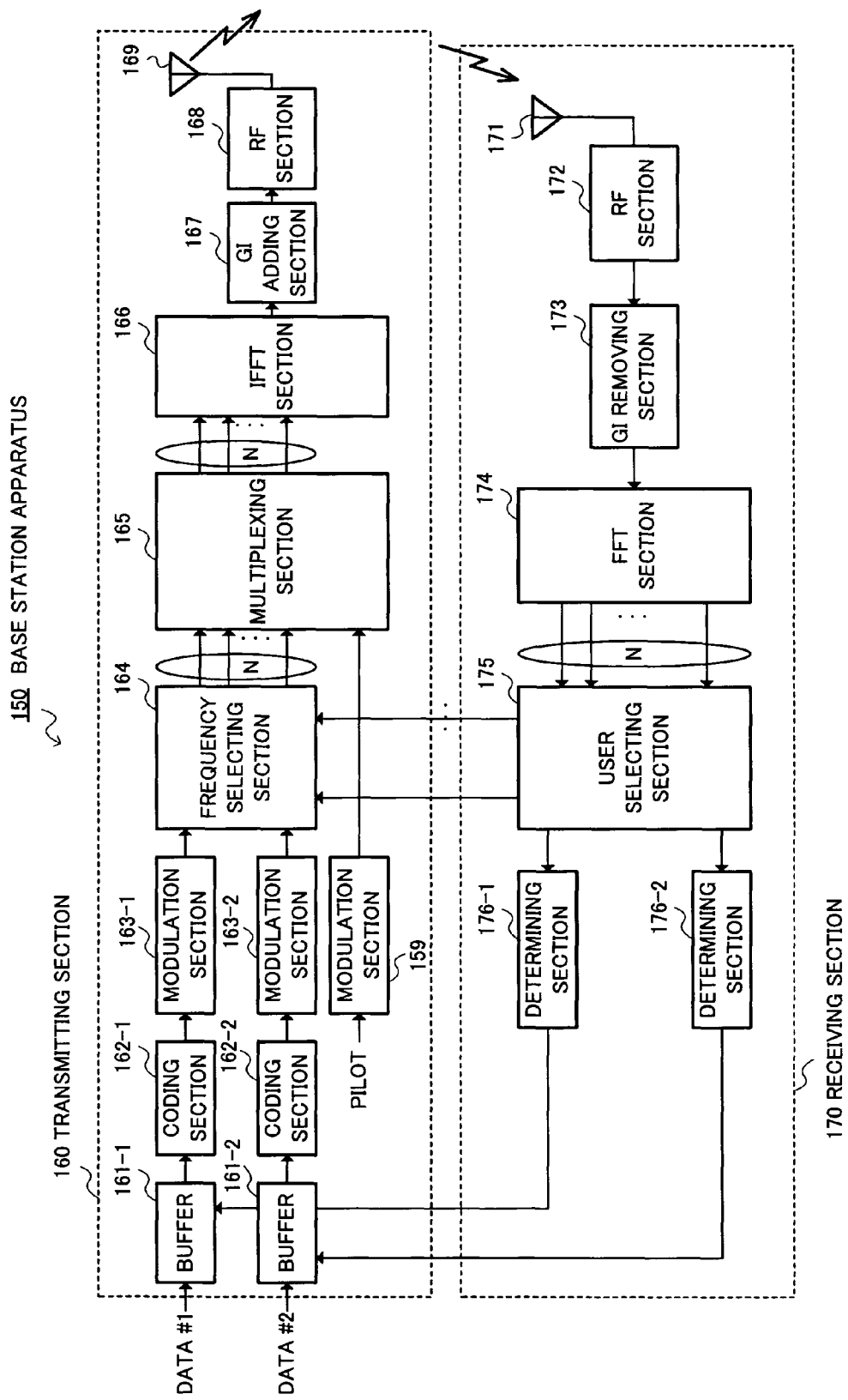
FIG. 7 is a block diagram illustrating a primary configuration of a base station apparatus according to Embodiment 1.

FIG. 7 is a block diagram illustrating a primary configuration of base station apparatus 150. A case where the number of users is two is described here as an example.

Base station apparatus 150 has transmitting section 160 and receiving section 170. Transmitting section 160 has buffers 161 (161-1, 161-2), coding sections 162 (162-1, 162-2), modulation sections 163 (163-1, 163-2), frequency selecting section 164, multiplexing section 165, IFFT section 166, GI adding section 167, RF section 168, transmission antenna 169 and modulation section 159. Receiving section 170 has reception antenna 171, RF section 172, GI removing section 173, FFT section 174, user selecting section 175, and determining sections 176 (176-1, 176-2).

Each section of base station apparatus 150 performs the following operation.

In receiving section 170, RF section 172 performs predetermined radio reception processing such as down-conversion and the like on a radio multicarrier signal received via reception antenna 171. GI removing section 173 removes the GI from the received multicarrier signal. FFT section 174 performs fast Fourier transform on the GI-removed received multicarrier signal to obtain N signals. User selecting section 175 selects a signal output from FFT section 174 per user, determines whether or not the signal includes an ACK/NACK signal, thereby identifies the used frequency band (used subband), and outputs used subband information. Determining sections 176 perform correlation calculation or pattern matching on the reception signal by a predetermined pilot pattern, determines whether or not data retransmission is required per user, and outputs the determination result to respective buffers 161.

In transmitting section 160, buffers 161 temporarily store data #1 and data #2 to be transmitted, immediately output these data to coding section 162 at first transmission, and read and output data subject to retransmission when receiving a retransmission instruction from determining section 176 in receiving section 170. Coding sections 162 perform coding on the transmission data temporarily stored in buffers 161. Modulation sections 163 perform predetermined modulation processing on the coded data. According to user selection information reported from user selecting section 175, frequency selecting section 164 selects frequency bands used by the transmission multicarrier signals, and assigns transmission signals to each frequency band. Multiplexing section 165 multiplexes a modulated pilot signal output from modulation section 159 on the transmission signals assigned to each frequency band. IFFT section 166 performs inverse fast Fourier transform on the pilot-multiplexed signal. GI adding section 167 adds a GI to the signal subjected to inverse fast Fourier transform. RF section 168 performs predetermined radio transmission processing such as up-conversion on the GI-added signal, and transmits the result via transmission antenna 169.

Figure 8:
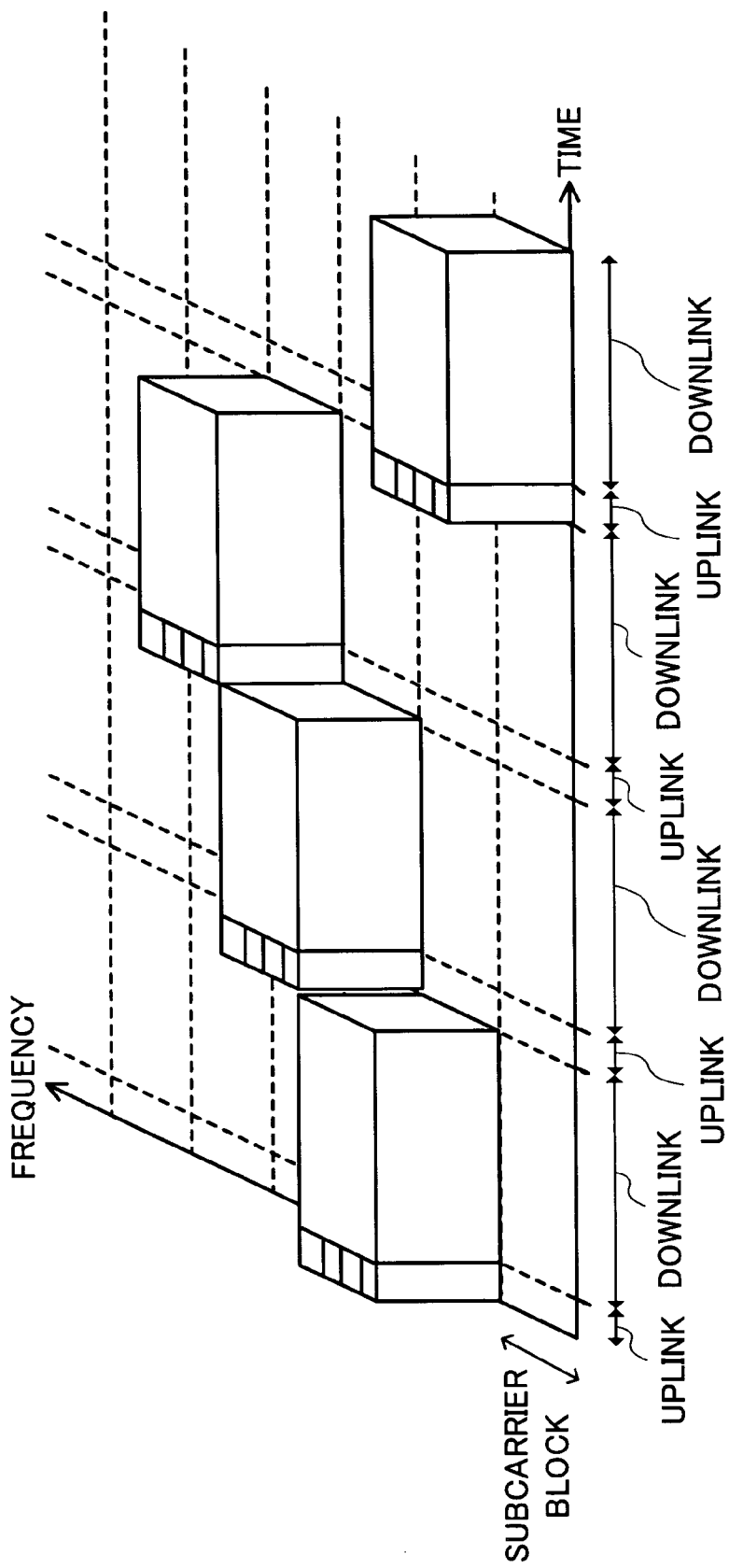
FIG. 8 is a diagram illustrating a configuration of a multicarrier signal transmitted from the base station apparatus, together with a multicarrier signal to be received.

FIG. 8 is a diagram showing a configuration of the multicarrier signal transmitted from base station apparatus 150, together with a configuration of a multicarrier signal received in base station apparatus 150. In other words, FIG. 8 shows the relationship between multicarrier signals on uplink and downlink.

The communication system according to this Embodiment employs the TDD scheme, and therefore, signals on uplink and downlink are multiplexed in the time-axis direction (the base station apparatus and mobile station apparatus respectively transmit downlink signals and uplink signals in time division). Further, the communication system according to this Embodiment employs the OFDM scheme, and therefore, signals to a plurality of users (mobile station apparatuses) are multiplexed in the frequency-axis direction (data for users is mapped on subcarriers orthogonal to each other on the frequency axis).

Base station apparatus 150 transmits the data for a user via a subband having the good propagation path state reported from mobile station apparatus 100. In other words, as shown in the figure, an uplink signal and a corresponding downlink signal of a user use the same frequency band (subband).

In addition, a case has been described here as an example where an uplink multicarrier signal is transmitted immediately after the downlink multicarrier signal is received, transmission timing of the downlink multicarrier signal is not limited to such timing. For example, base station apparatus 150 may transmit a downlink multicarrier signal after a predetermined time period since the uplink multicarrier signal is received.

Figure 9:
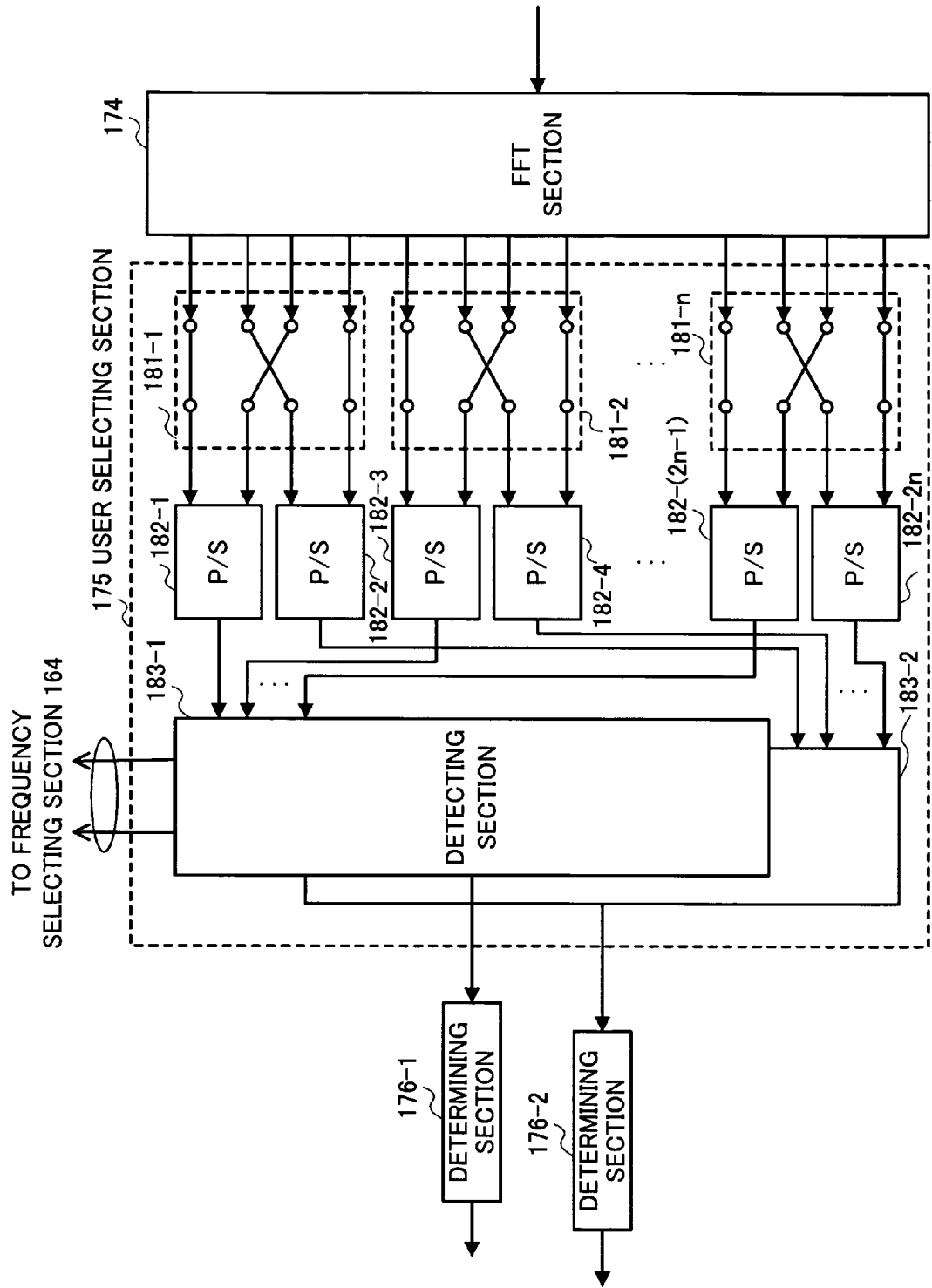
FIG. 9 is a block diagram illustrating an internal configuration of a user selecting section according to Embodiment 1.
Figure 10:
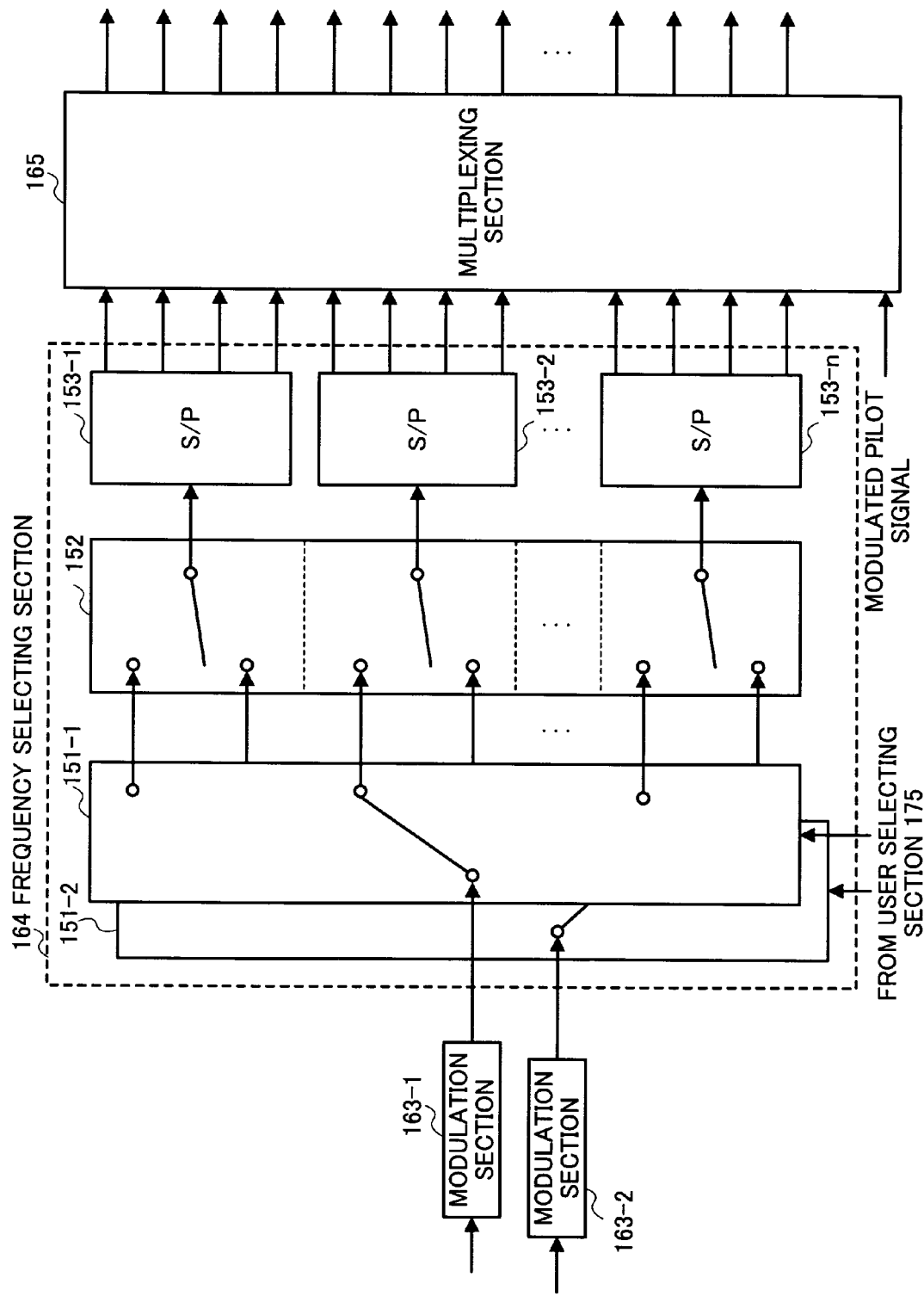
FIG. 10 is a block diagram illustrating an internal configuration of a frequency selecting section according to Embodiment 1.

FIGS. 9 and 10 are block diagrams respectively illustrating internal configurations of user selecting section 175 in receiving section 170 and of frequency selecting section 164 in transmitting section 160 to implement the above-mentioned operation.

User selecting section 175 in FIG. 9 has switches 181 (181-1, 181-2, . . . , 181-n), P/S conversion sections 182 (182-1, 182-2, . . . , 182-2n) and detecting sections 183 (183-1, 183-2) provided per user.

Switches 181 divide subcarrier signals divided by FFT section 174 into signals per user. More specifically, base station apparatus 150 knows in advance subcarriers that may be assigned to a user, collects (selects) subcarrier signals per user, and connects these signals to P/S conversion sections 182 installed corresponding to the user. For example, switch 181-1 collectively outputs subcarriers signals for user #1 to P/S conversion section 182-1, and collectively outputting subcarrier signals for user #2 to P/S conversion section 182-2.

P/S conversion sections 182 perform P/S conversion on the signals collectively output from switch 181 per user, and output the result signals to detecting section 183 as a single sequence signal. Here, a plurality of P/S conversion sections 182 exist per user, and signals for user #1 are output to detecting section 183-1, and signals for user #2 are output to detecting section 183-2.

Detecting sections 183 detect the ACK/NACK signal included in subbands per user, and detects a subband actually used in the ACK and NACK signal transmission. Then, detecting sections 183 output the ACK/NACK signal to determining section 176, and further output a subband detection result (position information of used subband) to frequency selecting section 164 in transmitting section 160.

The determining section 176 determines, per user, whether or not the reception signal is an ACK signal or NACK signal by correlation computation, pattern matching or the like.

Frequency selecting section 164 in FIG. 10 has switches 151 (151-1, 151-2), adjusting section 152 and S/P conversion sections 153 (153-1, 153-2, . . . , 153-n).

Switches 151 switch a modulated signal output from modulation section 163 to a user according to used subband information from user selecting section 175, and connect the modulated signal to an appropriate subband.

Adjusting section 152 basically outputs the data for users to the selected subband via the switches, and when a plurality of user requests overlap in the same subband, it makes an adjustment to avoid overlaps. This adjustment processing is omitted here since a case where more complicated adjustments are required will be described in Embodiment 2.

In order to make the signal output from adjusting section 152 multicarrier, S/P conversion sections 153 perform S/P conversion and output the result to multiplexing section 165.

The above is an explanation of base station apparatus 150

As described above, according to this Embodiment, propagation path determining section 131 in mobile station apparatus 100 determines the propagation path state through which a received multicarrier signal is transmitted, and specifies a frequency region having a good propagation path state in the used OFDM frequency band. More specifically, the used OFDM frequency band is divided into a plurality of frequency bands (subbands), each having predetermined bandwidth known to both the transmitting side and receiving side, and propagation path determining section 131 selects a subband having a propagation path state equal to or better than a predetermined level from the used OFDM frequency band. Then, mobile station apparatus 100 reports only the subband selected by propagation path determining section 131 to base station apparatus 150 as a transmitting side. Accordingly, the signal necessary for reporting the frequency region having the good propagation path state only comprises the information to identify the selected subband, and it is thus possible to reduce the data amount and improve communication system throughput. Further, by this means, the data amount on uplink is also reduced, and the power consumption can thus be minimized in mobile station apparatus 100. In addition, these features are not limited to automatic repeat request.

Further, in the above-mentioned configuration, each subband has bandwidth that is greater than or equal to a predetermined value so that a plurality of subcarriers can be allocated in a single subband. Also, within a single subband, in order to approximate fading in a single subband almost even, bandwidth is less than or equal to a predetermined value based on characteristics of frequency selective fading. Accordingly, in a subband determined to have a good propagation path state, even when data is transmitted using any subcarriers, the reception quality is improved on the receiving side. This feature is not limited to automatic repeat request control.

Furthermore, in the above-mentioned configuration, when frequency selecting section 113 of mobile station apparatus 100 reports base station apparatus 150 of a subband having a good propagation path state, mobile station apparatus 100 transmits a report signal via the subband selected by propagation path determining section 131.

Accordingly, only by identifying the subband used by mobile station apparatus 100 (without performing processing such as decoding and the like on the report signal), base station apparatus 150 is able to recognize the frequency region having the good the propagation path state. Further, since base station apparatus 150 does not perform processing such as decoding and the like, processing delay does not occur. In addition, this feature is not limited to automatic repeat request control.

Moreover, in the above-mentioned configuration, propagation path determining section 131 in mobile station apparatus 100 uses the above-mentioned report signal as an ACK/NACK signal in automatic repeat request control. Since the ACK/NACK signals is an originally indispensable signal to automatic repeat request control, by using this signal as the above-mentioned report signal, it is possible to further reduce the data amount on uplink.

Further, in the above-mentioned configuration, different pilot patterns are used for the ACK/NACK signal transmitted from mobile station apparatus 100, thereby enabling identification between ACK and NACK.

Automatic repeat request control is indispensable technique to enable high-quality packet communication and less reception error. However, with increases in speed and quality in packet communication, quality improvement in an ACK/NACK signal transmitted on an opposite channel has been required in order to prevent unnecessary retransmission and the like.

Accordingly, conventionally, error correcting coding technique such as convolutional coding and turbo coding have been applied to ACK/NACK signal. However, in general, error correcting coding and decoding needs a large amount of processing (particularly, a massive amount of processing is required in decoding processing of turbo coding having excellent error correcting capability), and there is a problem that significant processing delay occurs on the receiving side. Further, overall communication system throughput deteriorates with the processing delay, and the circuit scale of a reception apparatus increases.

In this Embodiment, different pilot patterns are used for the ACK/NACK signal, and error correcting coding is not applied to the ACK/NACK signal. This is because in this Embodiment the ACK/NACK signal is transmitted via a frequency band having a good propagation path state, and expected to be received on the receiving side without error. Accordingly, without performing advanced error correcting coding where data amount excessively increases, it is possible to improve reliability of the ACK/NACK, and the data amount can thereby be reduced on uplink. Further, determining section 176 in base station apparatus 150 is capable of performing an ACK/NACK determination processing by pilot pattern correlation processing, pattern matching or the like. In other words, base station apparatus 150 does not need decoding processing such as demodulation processing and error correction or the like. Accordingly, it becomes possible to reduce the processing delay and improve communication system throughput. Further, the circuit scale in base station apparatus 150 also decreases.

In the above-mentioned configuration, after transmitting section 110 reports the subband having a good propagation path state, receiving section 120 performs subsequent reception processing on this limited subband. Accordingly, it is possible to reduce the reception processing and power consumption.

In addition, although a case has been described as an example with this Embodiment where propagation path determining section 131 selects a single subband with the best propagation path state from the used frequency band of OFDM, propagation path determining section 131 may specify a frequency region (range) having a propagation path state that is equal to or better than a predetermined level. In other words, in this case, propagation path determining section 131 reports a plurality of subbands having the propagation path state equal to or better than a predetermined level to base station apparatus 150. Then, base station apparatus 150 selects a subband to be actually used for mobile station apparatus 100 among the plurality of reported subbands.

Further, although a case has been described as an example with this Embodiment where an estimation of the propagation path fluctuation is performed in selecting a subband having a good propagation path state, a subband having high reception power may be selected instead of the estimation of the propagation path fluctuation by measuring reception power of overall band data portion containing data for other users among downlink signals. Further, as a substitute for a reception level, other reception quality may be used such as SNR (Signal-to-Noise Ratio), SIR (Signal-to-Interference Ratio) and the like.

Furthermore, although a case has been described as an example with this Embodiment where mobile station apparatus 100 performs radio reception processing on the limited subbands previously reported when receiving data subjected to frequency scheduling and transmitted from base station apparatus 150, base station apparatus 150 may report a downlink subband actually assigned to the mobile station apparatus to a mobile station apparatus via a dedicated channel per user before transmitting data. By this means, mobile station apparatus 100 only needs to perform the radio reception processing on the limited subband reported from base station apparatus 150, and the number of subbands subject to the processing can be further reduced. Accordingly, it is possible to reduce processing delay and power consumption. Further, in this case, for a dedicated channel, a subcarrier preset per user may be used. By this means, the subcarriers are user-specific, signals are orthogonal to one another between users, so that it is surely possible to multiplex the users. In addition, also when the competition occurs in assignments on downlink, base station apparatus 150 similarly reports a subband finally assigned after resolving the competitive relationship to mobile station apparatus 100 via a control channel, so that the processing amount decreases in mobile station apparatus 100. This method is particularly effective in the case of applying the communication system according to this Embodiment to the existing system (for example, 3rd generation mobile communication system).

Moreover, in this Embodiment, since the TDD scheme communication system is taken as an example, the same frequency band is used both on uplink and downlink. By selecting a subband having a good propagation path state on downlink, and transmitting a report signal on uplink via the same subband, it is possible to report the selected subband to the base station apparatus. However, also in the communication system using different frequency bands for uplink and downlink, if an agreement is set in advance such that subband #1 on downlink corresponds to subband #10 on uplink—that is, the correspondence between the subband on uplink and the subband on downlink—, the present invention can be applied. In other words, it is possible to report a selected subband having a good propagation path state on downlink to the base station apparatus by transmitting a report signal via a subband on uplink corresponding to the selected subband.

Figure 11:
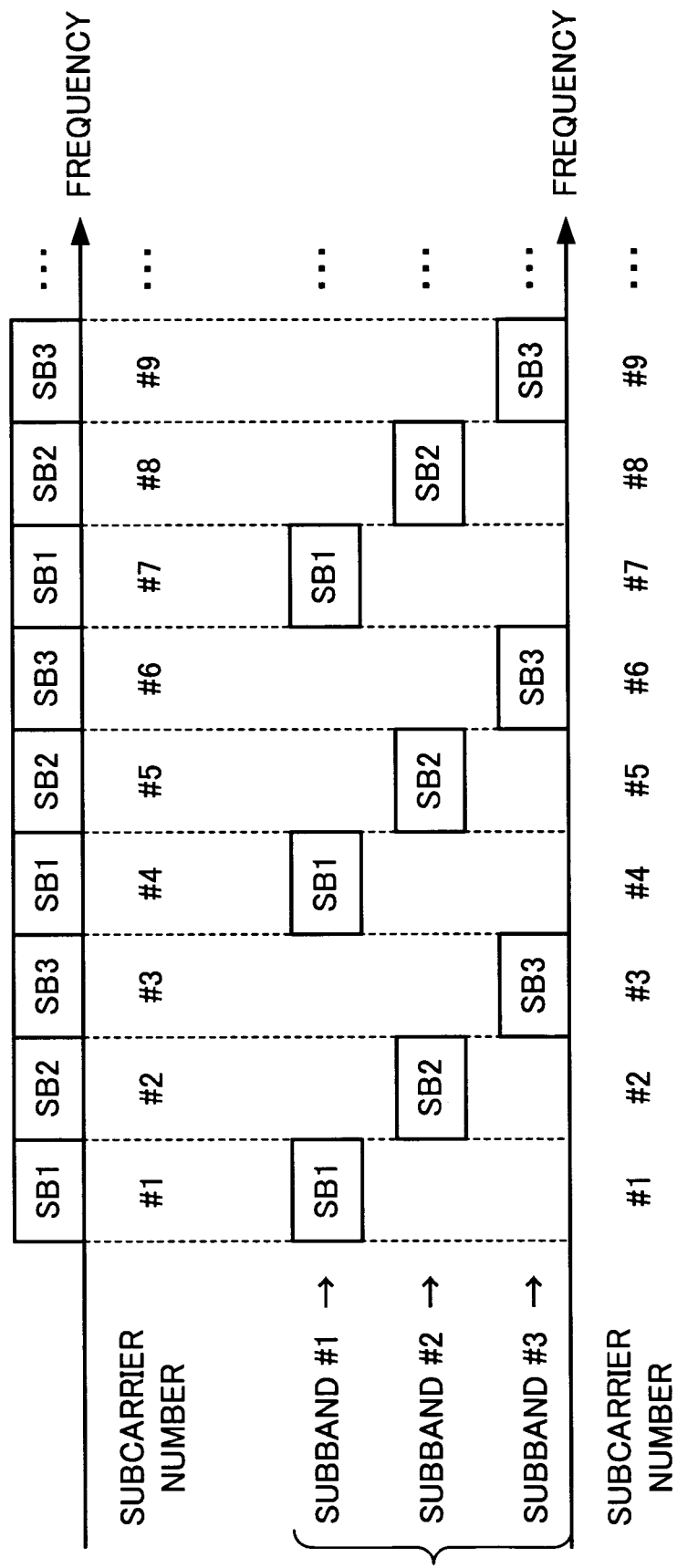
FIG. 11 is a signal configuration diagram showing another variation of the relationship between subbands and subcarrier signals.

Further, although a case has been described as an example with this Embodiment where a plurality of subbands are allocated in each subband—that is, a plurality of successively positioned subcarriers are grouped into a single subband (see FIG. 3), the method of setting a subband is not limited to the above-mentioned method. For example, FIG. 11 is a signal configuration diagram showing another variation of the relationship between subbands and subcarrier signals. For the sake of clarity, the signal diagram on the bottom in FIG. 11 shows subcarriers shown on the top in FIG. 11 for each subband. In addition, in these diagrams, "SB" is an abbreviation of a "subband." In this example, a plurality of subcarriers spaced apart by predetermined frequencies is grouped to be a subband. More specifically, subband #1 is formed with subcarriers #1, #4 and #7, subband #2 is formed with subcarriers #2, #5 and #8, and subband #3 is formed with subcarriers #3, #6 and #9. Then, for example, mobile station apparatus 100 calculates an average reception power value of subcarriers included in subband #1, compares the average value to an average value similarly calculated from another subband, and thereby selects a subband having a good propagation path state. By employing such a signal configuration, in such a propagation path environment that periodical fading characteristics are shown on the frequency axis, it is possible to specify a frequency region having a good propagation path state and perform frequency scheduling.

Furthermore, although a case has been described as an example with this Embodiment where the ACK and NACK signals are identified by a pilot pattern of pilot signals, ACK/NACK may be identified by reception power of the ACK and NACK signals.

Still furthermore, although a case has been described as an example with this Embodiment where the ACK and NACK signals are distinguished by a pilot pattern of pilot signal, a form may also be employed, where the ACK and NACK signals are distinguished by another method. For example, a data generating section is installed as a substitute for pilot selecting section 111, and ACK and NACK signals may be respectively assigned "0" and "1", modulated by a robust modulation scheme such as BPSK (Binary Phase Shift Keying) and transmitted. By this means, the receiving side is capable of identifying the ACK or NACK signal without performing error correcting processing.

Moreover, in this Embodiment, since the transmitting side transmits data using a subband having a good propagation path state, the reception quality is improved on the receiving side. Accordingly, for example, in a communication system in which the receiving side requests for MCS (Modulation and Coding Scheme) of a transmission signal to the transmitting side as in the HSDPA scheme, it is possible to select MCS having a higher transmission rate (less robust).

Further, the pilot symbols of the ACK/NACK signal may be repeated when the number of users accommodated in the communication system is small. By this means, it is possible to improve reception quality on the receiving side. Also, by this means, reliability of the ACK/NACK signal can be improved, and it is thus possible to improve communication system throughput. In addition, the number of repetitions is set according to the number of users, and indicated to a mobile terminal by the base station.

Furthermore, the pilot symbol repetition may be transmitted via a plurality of subbands. It is thereby possible to report subbands with good propagation path states to a plurality of transmitting sides.

Moreover, signals to a plurality of users may be multiplexed further on subbands by code multiplexing or the like. By this means, it is possible to increase the number of users to accommodate. Meanwhile, even when a plurality of users are concentrated on the same subband, accommodation is possible without interfering with one another.

Figure 12:
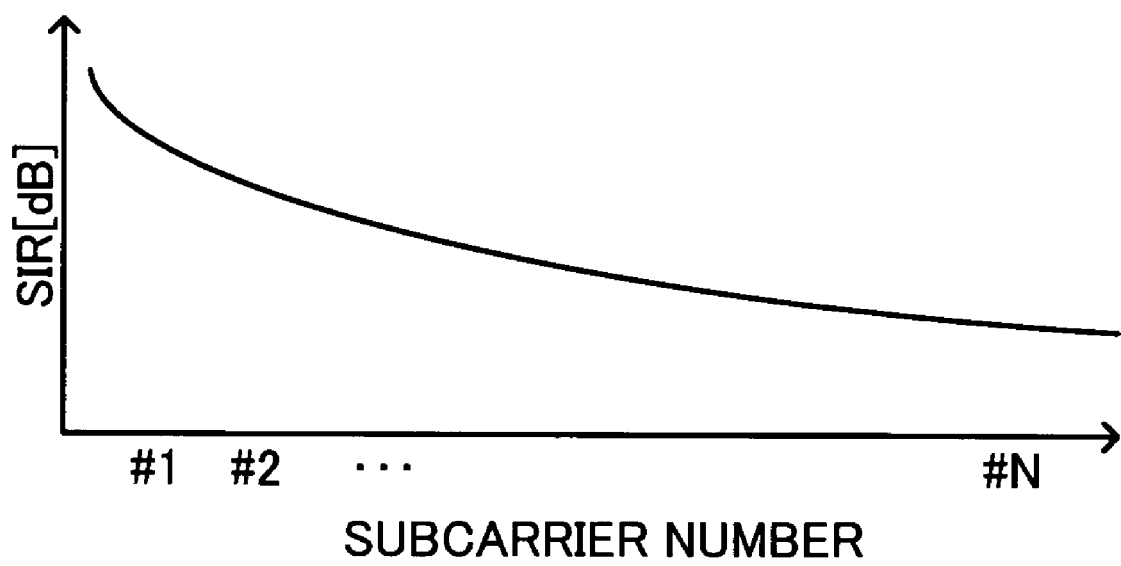
FIG. 12 is a graph showing frequency characteristics of reception quality in a base station apparatus.

Further, with respect to data transmitted on uplink, a low frequency band may be assigned to a user with a high priority, and a high frequency band may be assigned to a user with a relatively low priority. FIG. 12 is a diagram showing frequency characteristics of reception quality (herein, SIR) in a base station apparatus. As shown in the figure, when the OFDM scheme is applied to uplink, reception SIR in the base station apparatus tends to deteriorate as the frequency is higher, due to ICI (Inter-Carrier-Interference) effect caused by sampling jitter of mobile station apparatus. Accordingly, by assigning a low frequency band (for example, a carrier having a low center frequency) to a user with a high priority, and assigning a high frequency band to a user with a relatively low priority, it is possible to improve the overall communication system throughput.

Embodiment 2

Figure 13:
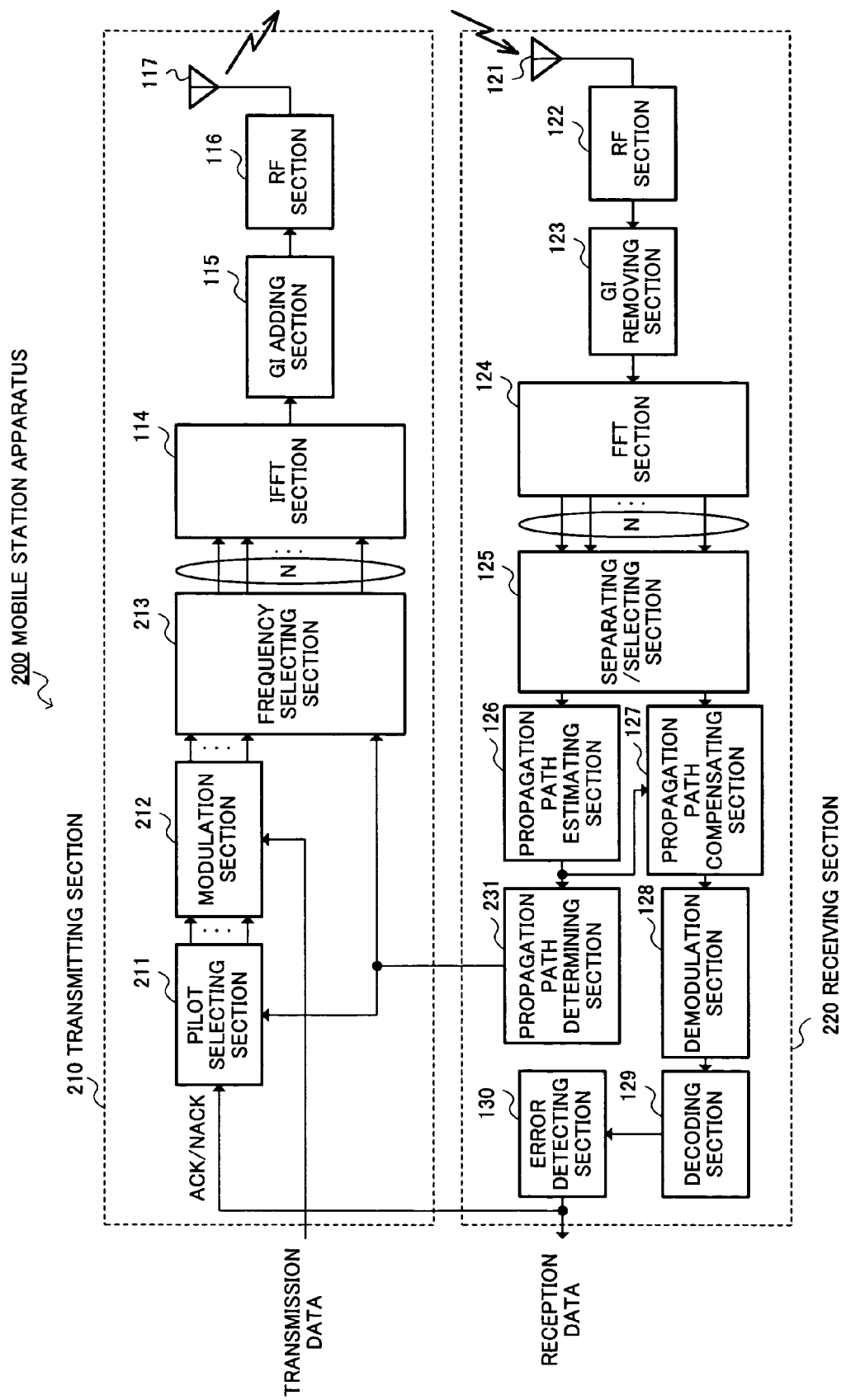
FIG. 13 is a block diagram illustrating a primary configuration of a mobile station apparatus according to Embodiment 2.

FIG. 13 is a block diagram illustrating a primary configuration of mobile station apparatus 200 according to Embodiment 2 of the present invention. Mobile station apparatus 200 has the same basic configuration as that of mobile station apparatus 100 as shown in FIG. 1, and the same structural elements are assigned the same reference numerals to omit descriptions thereof.

It is a feature of mobile station apparatus 200 according to this Embodiment that propagation path determining section 231 of receiving section 220 assigns priorities to subbands having better propagation path states in descending order, and outputs priority information to both pilot selecting section 211 and frequency selecting section 213 in transmitting section 210. Pilot selecting section 211 and frequency selecting section 213 report the above-mentioned information to the base station apparatus by a predetermined method.

In mobile station apparatus 200 owned by users, propagation path estimating section 126 calculates channel estimation values and the like regarding all regions of the used OFDM downlink frequency band, and obtains propagation path fluctuation information. Propagation path determining section 231 assigns priorities to subbands having better propagation path states (or, having higher reception level or SNR) in descending order based on this information. These priorities are assigned up to the predetermined number (predetermined rank). Then, propagation path determining section 231 reports the subband information including the priorities to pilot selecting section 211 and frequency selecting section 213.

Figure 14A:
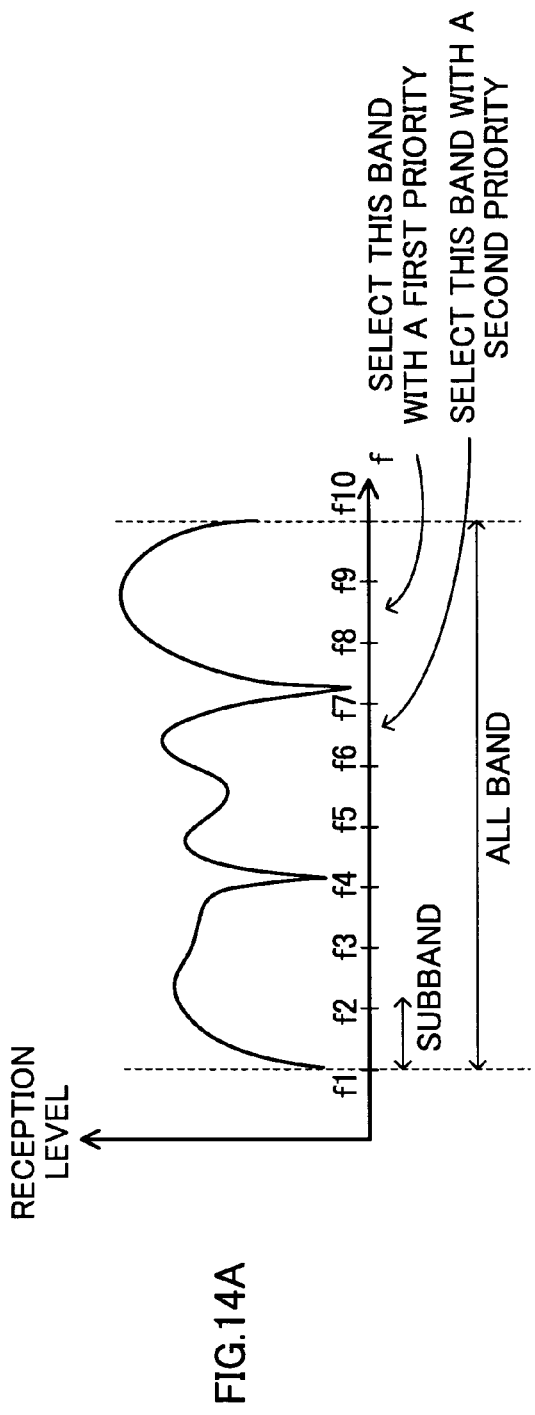
FIG. 14A is a graph showing subbands assigned priorities, together with a downlink propagation path state.
Figure 14B:
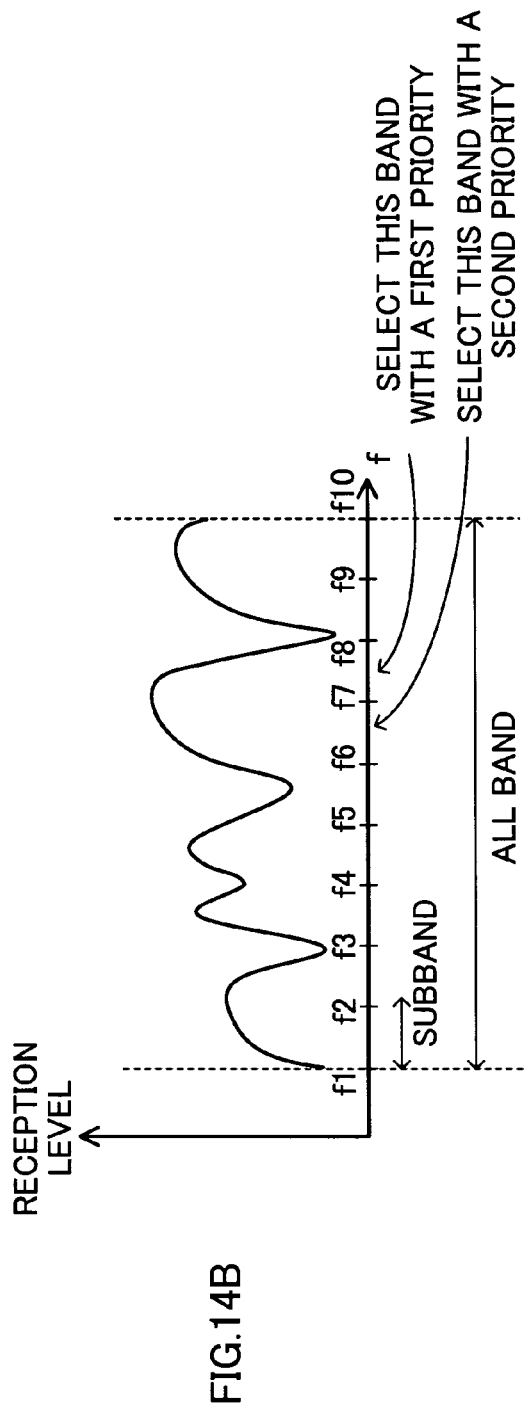
FIG. 14B is another graph showing subbands assigned priorities, together with a downlink propagation path state.

FIGS. 14A and 14B are graphs showing subbands assigned priorities by propagation path determining section 231, together with the downlink propagation path state. FIG. 14A shows the case of user #1, and FIG. 14B shows the case of user #2. Further, for the sake of clarity, the propagation path states are represented by reception signal reception levels of the mobile station apparatus, instead of the channel estimation value.

In the case of user #1 shown in FIG. 14A, since a subband in the frequencies f8 to f9 provides the highest reception level, this subband is first selected and assigned a first rank priority. Next, since a subband in frequencies f6 to f7 provides the second highest reception level, this subband is selected and assigned a second rank priority. If the predetermined number of priority is up to second rank, the priority assigning processing is completed. Likewise, in the case of user #2 as shown in FIG. 14B, a subband in frequencies f7 to f8 and a subband of frequencies between f6 and f7 are assigned priorities in this order.

Pilot selecting section 211 selects a specific corresponding pilot pattern from a plurality of pilot patterns, according to both the ACK/NACK information output from error detecting section 130 and subband information per user assigned priorities and output from propagation path determining section 231. In other words, by using a plurality of kinds of pilot patterns, the ACK/NACK signals to be transmitted is given information related to the priorities.

FIG. 15 is a table showing an example of pilot patterns pilot selecting section 211 selects.

As shown in this figure, a pilot signal is comprised of a pilot pattern containing two bits, where the first bit is for identifying ACK/NACK signal and the second bit is for indicating the priority. According to this pilot pattern, it is possible to indicate both the ACK/NACK information and the priority information. This figure shows an example where predetermined priorities are provided up to a second rank.

Figure 16:
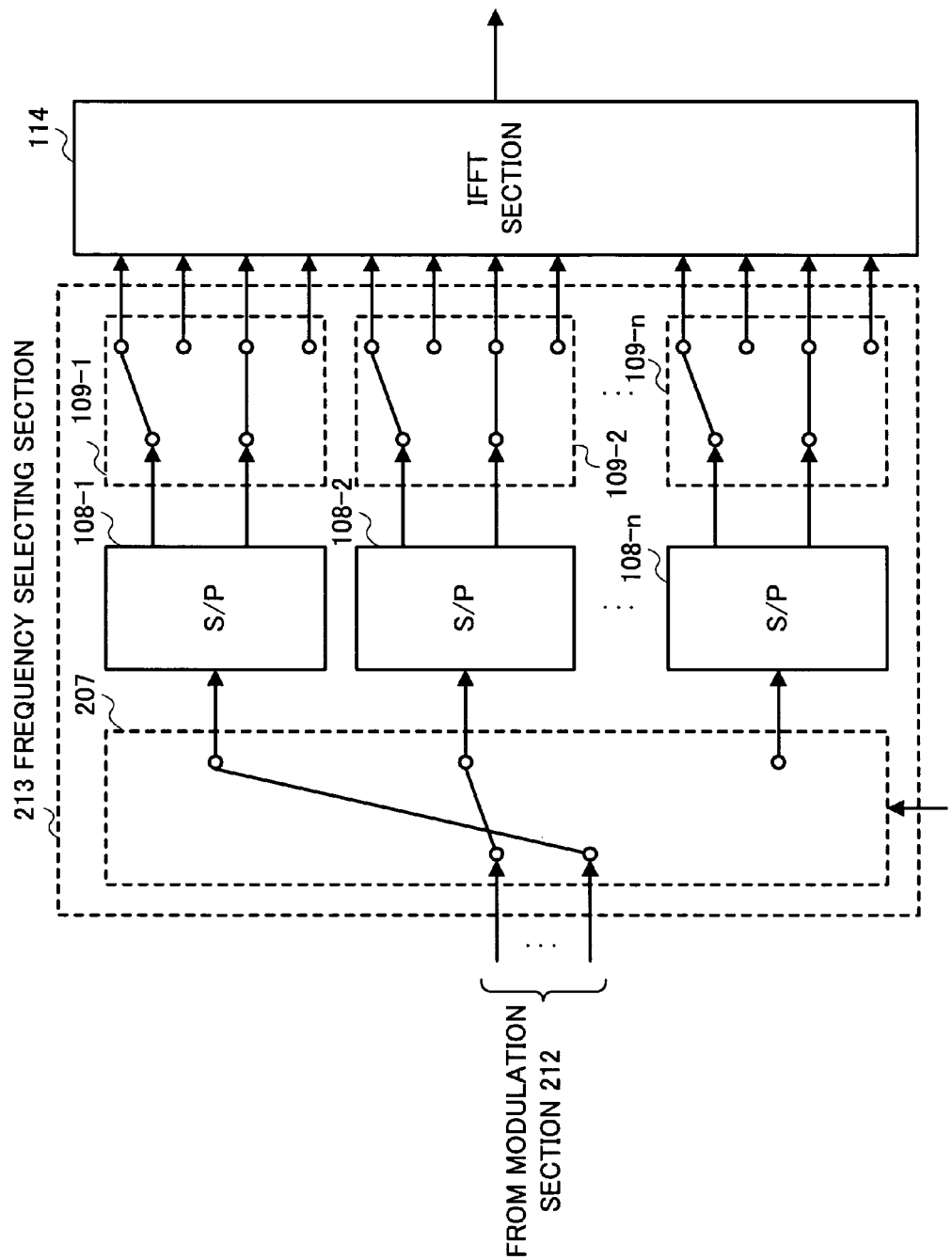
FIG. 16 is a block diagram illustrating an internal configuration of a frequency selecting section according to Embodiment 2.

FIG. 16 is a block diagram illustrating an internal configuration of frequency selecting section 213 to implement the above-mentioned operation.

Frequency selecting section 213 has the same basic configuration as that of frequency selecting section 113 shown in FIG. 5, and differs from frequency selecting section 113 in that a plurality of ACK/NACK signals are input to switch 207 from modulation section 212. The plurality of ACK/NACK signals input from modulation section 212 are assigned priorities, but, without regard to the priorities, frequency selecting section 213 simply switches output terminals of corresponding subbands and connects the signals.

This is an explanation on mobile station apparatus 200. Next, base station apparatus 250 that receives multicarrier signals transmitted from mobile station apparatus 200 will be described.

The basic configuration of base station apparatus 250 is almost the same as that of base station apparatus 150 as shown in FIG. 7 in Embodiment 1, and descriptions of the basic configuration are omitted.

Figure 17:
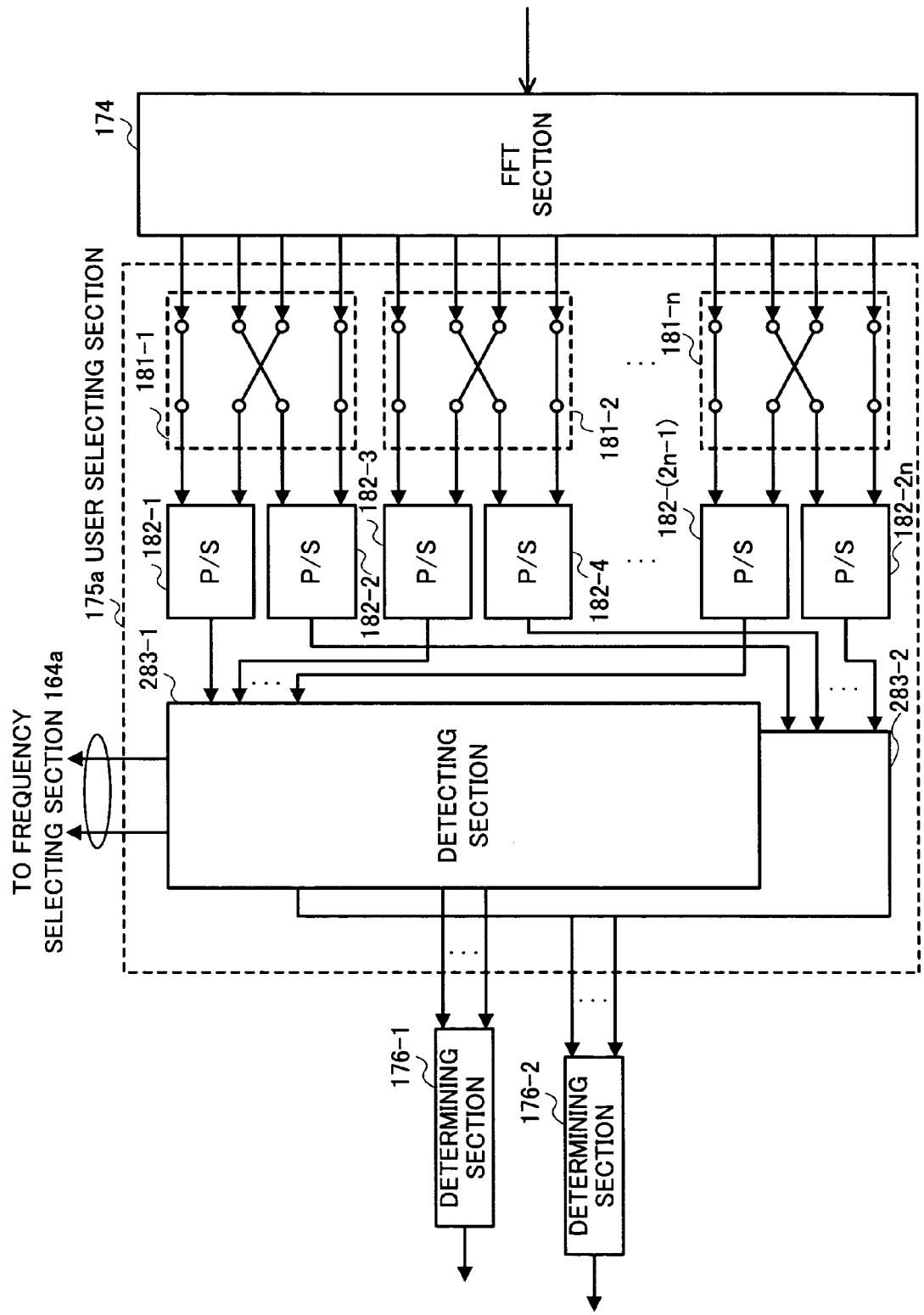
FIG. 17 is a block diagram illustrating an internal configuration of a user selecting section according to Embodiment 2.

FIG. 17 is a block diagram illustrating an internal configuration of user selecting section 175a in base station apparatus 250. In addition, a basic configuration of user selecting section 175a is almost the same as that of user selecting section 175 as shown in FIG. 9, and only differences will be described.

Detecting sections 283 (283-1, 283-2) detects a plurality of subbands used by mobile station apparatus 200, outputs ACK/NACK signals received in the subbands to determining section 176, and further outputs these position information of the subbands to frequency selecting section 164a. At this point, since the ACK/NACK signals are given the priority information, the detecting section 283 further extracts the priority information by correlation computation, pattern matching or the like, and also outputs the information to frequency selecting section 164a.

Figure 18:
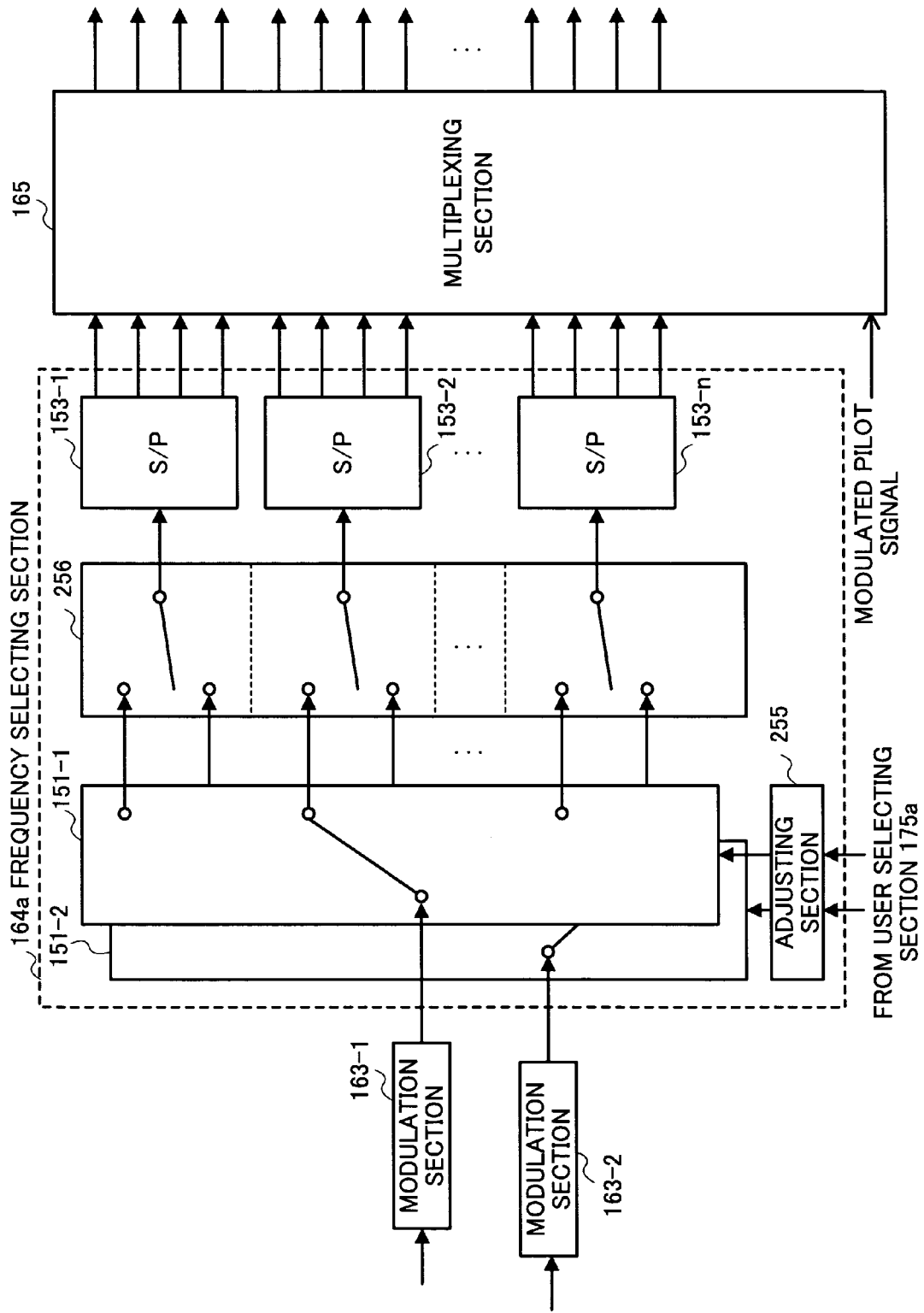
FIG. 18 is a block diagram illustrating an internal configuration of another frequency selecting section according to Embodiment 2.

FIG. 18 is a block diagram illustrating an internal configuration of frequency selecting section 164a in base station apparatus 250. A basic configuration of frequency selecting section 164a is also almost the same as that of frequency selecting section 164 shown in FIG. 10, and only differences will be described.

Based on the position information of subbands for the users and the priority information output from user selecting section 175a, adjusting section 255 adjusts and decides to which subbands the modulated signals for the users are assigned, and outputs this assignment information to switches 151. Switches 151 switch modulated signals for the users output from modulation section 163 based on the subband assignment information output from adjusting section 255, and outputs result signals to switch 256. Switch 256 connects the data for a user, which is input via switches 151, to an appropriate subband.

Next, the subband assignment adjusting method in adjusting section 255 will be described in detail.

Adjusting section 255 first determines whether or not a first priority subband for a user competes with another user. Then, when the first priority subband for one user competes with a first priority subband for another user, adjusting section 255 resolves the competitive relationships between the users by the following procedures.

Figure 19:
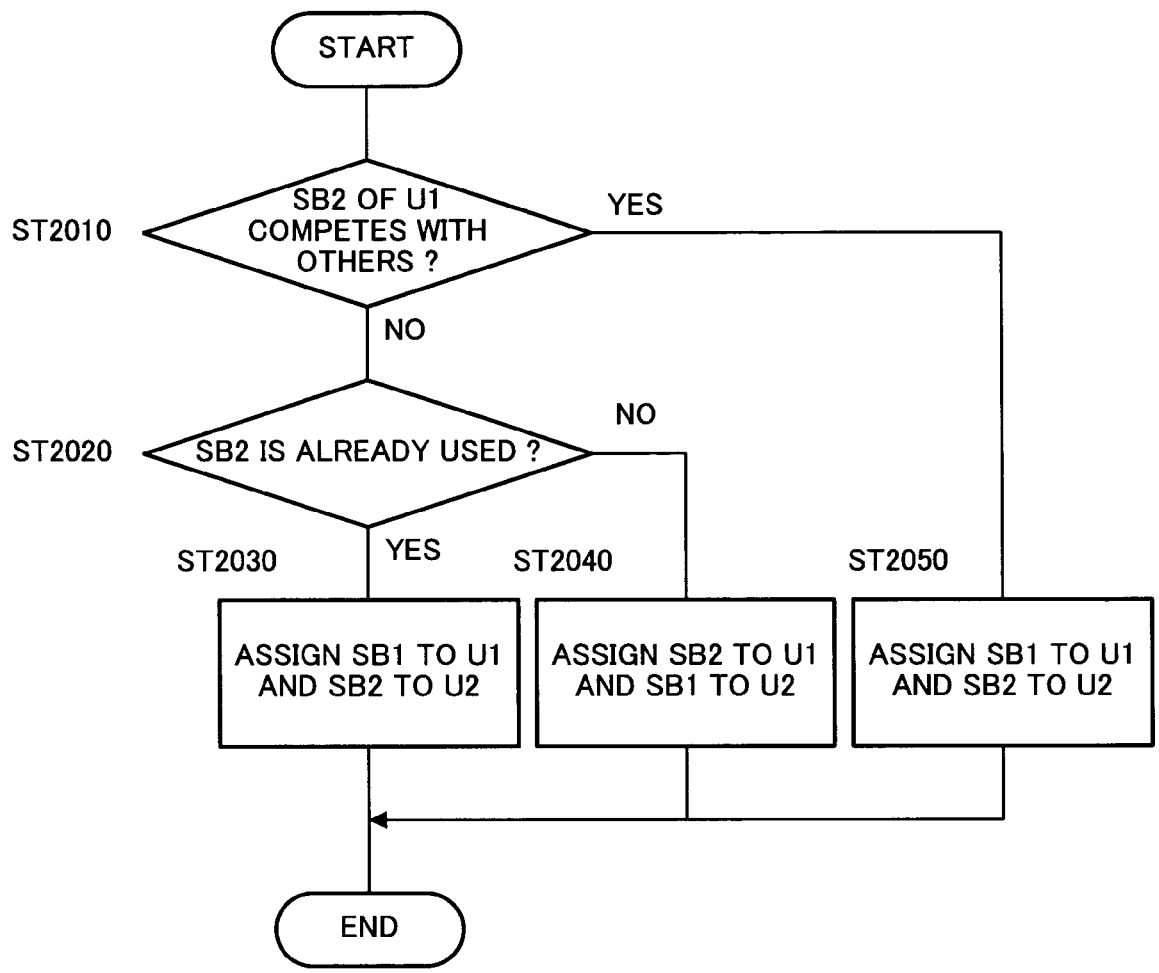
FIG. 19 is a flowchart illustrating a competitive relationship resolution procedure.

FIG. 19 is a flowchart illustrating procedures of competitive relationship resolving processing. In addition, for ease of explanation, the above-mentioned competitive relationship is assumed to occur between users #1 and #2. In the figure, user #1 is abbreviated as "U1", user #2 is abbreviated as "U2", a first priority subband is abbreviated as "SB1", and a second priority subband is abbreviated as "SB2."

Adjusting section 255 first determines whether or not a second priority subband for user #1 competes with (a second priority subband for) another user (ST2010) When the competitive relationship does not occur, whether or not the second priority subband is already used by (assigned to) another user is checked. When the subband is already used by another user, the first priority subband is assigned to user #1, and the second priority subband is assigned to user #2 (ST2030). When the second priority subband for user #1 is not yet used in ST2020, adjusting section 255 assigns the second priority subband to user #1 and the first priority subband to user #2 (ST2040). Further, when a competitive relationship occurs for the second priority subband for user #1 in ST2010, adjusting section 255 assigns the first priority subband to user #1, and assigning the second priority subband to user #2 (ST2050).

In addition, when the competitive relationship of the first priority subband is not resolved even by the aforementioned processing, for example, when the second priority subband to be assigned to user #2 is already assigned to another user in ST2050, the second priority in ST2010 is changed to the third priority, and subsequent processing is performed again.

To summarize the points of the adjusting method above, when a competitive relationship occurs in an nth priority subband, adjusting section 255 checks if there is unavailability in this (n+1th priority) subband for a user, for which this (n+1th priority) subband cannot be assigned to that user. Then, when there is unavailability in the n+1th priority subband for a user, the nth priority subband is preferentially assigned to this user in which unavailability exists. The reason for employing this procedure will be described below.

Figure 20:
FIG. 20 is a diagram showing a specific example of subband assignment.

FIG. 20 is a diagram showing a specific example of subband assignment performed according to the above-mentioned flow.

For example, the first priority subband "7" for user #2 does not compete with the other users, so that subband "7" is directly assigned to user #2. At this point, the second priority subband "7" for user #1 has already been determined to be used for user #2, and therefore, is deleted from a priority list for user #1.

Meanwhile, the first priority subbands for users #1 and #3 compete with each other. Accordingly, since the assignment cannot be performed in this state, the second priority subbands are focused on. The second priority subband "7" for user #1 is already unavailable as described above. In other words, in the second priority subband for user #1, such unavailability exists that the subband cannot be used for the assignment. Therefore, the first priority subband "5" is used for user #1. Then, the first priority subband "5" for user #3 is in use and user #3 is assigned the second priority subband "6."

If the first priority subband "5" is assigned to user #3, user #1 is assigned a third priority subband for user #1, and this results in an undesirable situation. According to the above-mentioned assignment method, it is possible to avoid this kind of situation. This is the reason for performing the above-mentioned assignment.

Adjusting section 255 in base station apparatus 250 is able to adjust subband assignment by the above-mentioned method.

Mobile station apparatus 200 performs the reception processing on all the subbands assigned priorities and reported, and demodulates only the data for mobile station apparatus 200. By this means, even when the competitive relationship occurs on downlink, mobile station apparatus 200 can receive the data for mobile station apparatus 200 without having the assignment information report from base station apparatus 250.

Thus, according to this Embodiment, the mobile station apparatus assign priorities to a plurality of subbands having good propagation path states on downlink, and reports the subbands to the base station apparatus, so that the base station apparatus is able to perform frequency scheduling taking into consideration the situations of a plurality of users (by making adjustments between a plurality of users). Accordingly, it is possible to improve communication system throughput.

In addition, although a case has been described as an example with this Embodiment where subbands are assigned priorities up to a predetermined rank in order of excellence of the propagation path state, for example, propagation path determining section 231 in receiving section 220 may select a plurality of subbands having propagation path states equal to or better than a predetermined level, and then assigns priorities to all the subbands. Also by this method, it is possible to reduce the data amount on uplink.

Further, although a case has been described as an example with this embodiment where a propagation path state for each subband is considered upon priority assignment, degree of intensity of propagation path fluctuations in a subband may be taken into consideration. In other words, the degree of the intensity of propagation path fluctuation in a subband is obtained by dispersion of the channel estimation value or the like, and a subband having large dispersion is lower priority assigned.

Furthermore, although a case has been described as an example with this Embodiment where mobile station apparatus 200 distinguishes the priority information by different pilot patterns and sends the information to the base station apparatus, mobile station apparatus 200 may distinguish and transmit the priority information by differentiating transmission power for the ACK and NACK signals. By this means, it is possible to make pilot patterns of a plurality of pilot signals to be transmitted the same, perform symbol combination on the base station apparatus side, and improve the ACK and NACK signal reliability. Accordingly, when a plurality of mobile station apparatuses select the same subband, by assigning downlink subbands based on priorities, it is possible to guarantee high-quality communication for a plurality of mobile station apparatuses, and improve communication system throughput.

Moreover, in the above-mentioned example, mobile station apparatus 200 may transmit the ACK and NACK signals with the same transmission power. In other words, although the mobile station apparatus side does not report the priority information to the base station apparatus side, the base station apparatus side may compare reception levels of a plurality of ACK/NACK signals transmitted from the mobile station apparatus, and assign priorities to the subbands having good reception levels in descending order. By this means, even when the propagation path state of a subband selected based on the downlink propagation path state has changed with time during uplink communication, priorities are assigned taking the propagation path fluctuations on uplink directly into consideration, so that more accurate frequency scheduling become possible.

Embodiment 3

Figure 21:
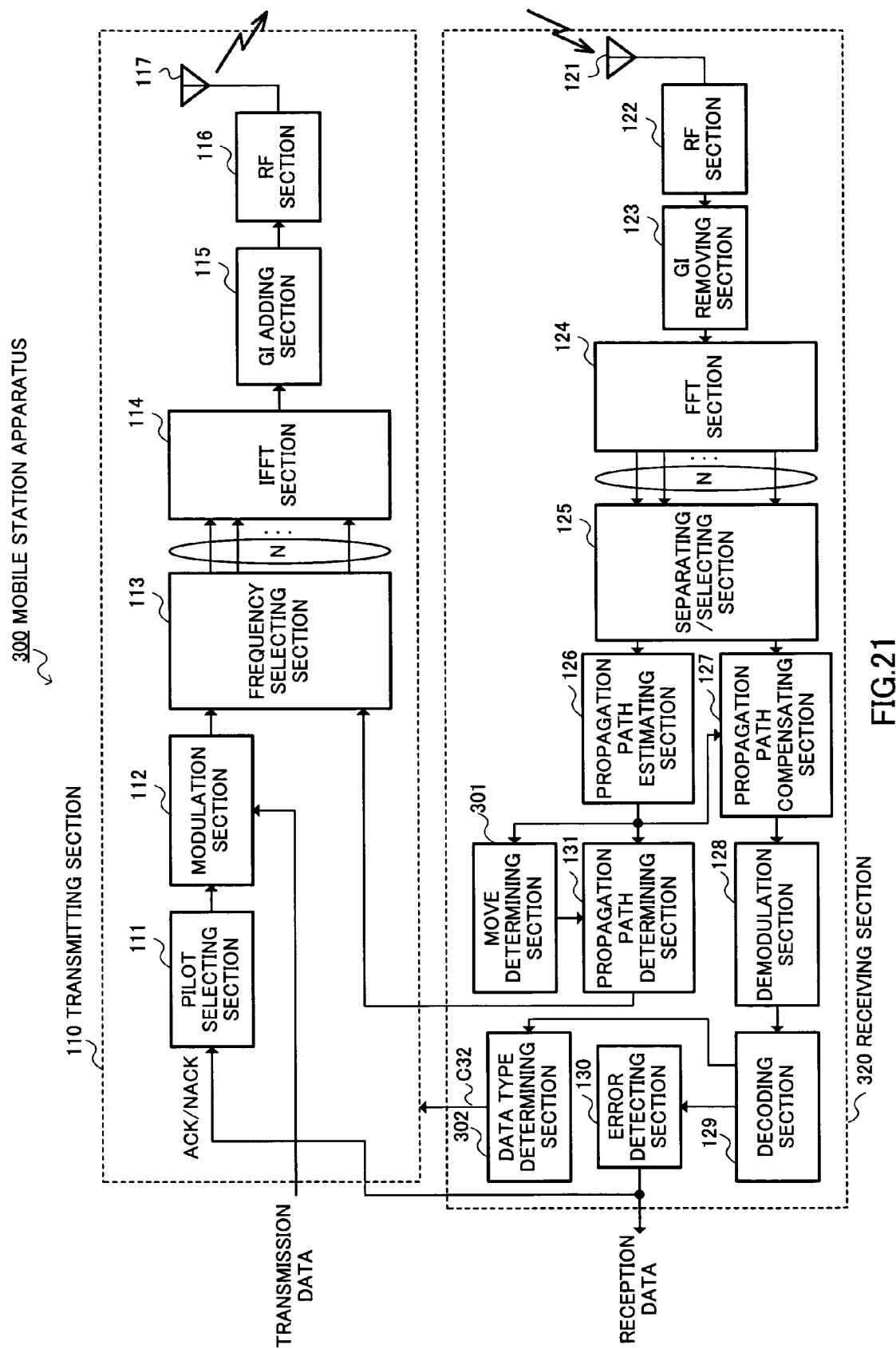
FIG. 21 is a block diagram illustrating a primary configuration of a mobile station apparatus according to Embodiment 3.

FIG. 21 is a block diagram illustrating a primary configuration of mobile station apparatus 300 according to Embodiment 3 of the invention. In addition, mobile station apparatus 300 has the same basic configuration as that of mobile station apparatus 100 as shown in FIG. 1, and the same structural elements are assigned the same reference numerals to omit descriptions thereof.

Features of mobile station apparatus 300 according to this Embodiment is having move determining section 301 and data type determining section 302, and stopping a certain predetermined circuit that does not need to operate when mobile station apparatus 300 is not in a moving state, or, when received data corresponds to a specific data type.

Move determining section 301 measures a Doppler frequency from the channel estimation value output from propagation path estimating section 126, thereby determining whether or not mobile station apparatus 300 is in a moving state. Then, when mobile station apparatus 300 is determined not to be in the moving state, move determining section 301 outputs a control signal (stop signal) C31 to propagation path determining section 131, and stops propagation path determining section 131 for a predetermined time period. In addition, a GPS (Global Positioning System) signal may be used for determination of the moving state.

In mobile communication systems, the most significant factor in change in the propagation path state is a move of a mobile station apparatus itself. Accordingly, in this Embodiment, when move determining section 301 determines the mobile station apparatus is not in the moving state, a predetermined circuit that does not need to operate, namely, propagation path determining section 131 is stopped for a predetermined time period under the assumption that the fluctuation within a relatively short time is small. By this means, it is possible to reduce power consumption in mobile station apparatus 300.

Further, when the predetermined time period passed after move determining section 301 outputs stop control signal C31, move determining section 301 outputs control signal C31 to start the operation, and resumes the operation of propagation path determining section 131. Further, also when mobile station apparatus 300 is determined to be in the moving state before the predetermined time period has passed, mobile station apparatus 301 outputs control signal C31 to start the operation, and resumes the operation of propagation path determining section 131.

Data type determining section 302 determines a type of received data output from decoding section 129, namely, speech data, streaming data, packet data or the like. Then, when the received data corresponds to a specific data type, data type determining section 302 outputs control signal (stop signal) C32 to transmitting section 110 to stop the ACK/NACK signal transmission for a predetermined time period.

As described above, mobile station apparatus 300 reports subbands having good propagation path states to the base station apparatus. Accordingly, within a certain time period, probability that mobile station apparatus 300 erroneously receives data transmitted from the base station apparatus is low. Meanwhile, the types of received data include speech data, streaming data for video stream distribution, packet data such as e-mail and the like. Here, the speech data, streaming data and the like have features of having strong real-time characteristics, having the data basically transmitted successively from the base station apparatus, and being allowed to have reception error to some extent. On the other hand, packet data has features of having weak real-time characteristics, being allowed to have transmission delay to some extent and being transmitted intermittently.

Accordingly, in this Embodiment, when received data is data successively transmitted from the base station apparatus, under the assumption that probability that mobile station apparatus 300 erroneously receives data transmitted from the base station apparatus within a short time period after reporting subbands having good propagation path states to the base station apparatus, ACK/NACK signal transmission, namely, automatic repeat request control is stopped for a predetermined time period. By this means, it is possible to reduce power consumption in mobile station apparatus 300.

Further, also in the case where received data is data for which reception error is allowed to some extent, automatic repeat request control can be stopped. In such a case, automatic repeat request control is stopped for the predetermined time period, or until the data type is changed.

In addition, in the case where the base station apparatus reports a data type while transmitting the data, the above-mentioned operation can be performed without installing data type determining section 302.

Figure 22:
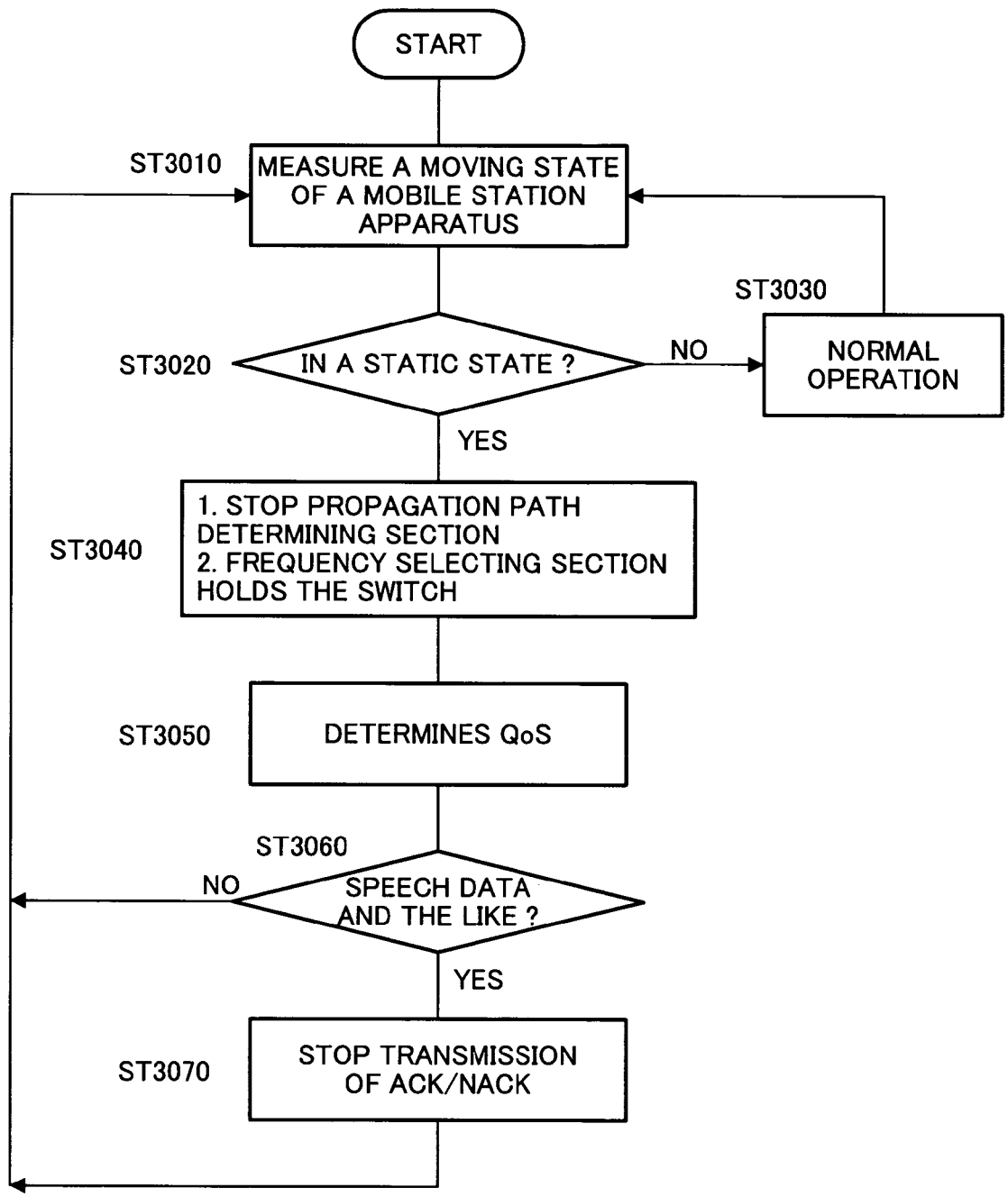
FIG. 22 is a flowchart illustrating procedures of circuit stop processing in a move determining section and data type determining section according to Embodiment 3.

FIG. 22 is a flowchart illustrating procedures of circuit stopping processing of move determining section 301 and data type determining section 302.

First, move determining section 301 measures the moving state of mobile station apparatus 300 (ST3010). Then, move determining section 301 determines whether mobile station apparatus 300 is moving or static (ST3020), and, when mobile station apparatus 300 is determined to be moving, the normal processing already described in Embodiments 1 and 2 is performed (ST3030). Meanwhile, when mobile station apparatus 300 is determined to be static, move determining section 301 stops propagation path determining section 131 (ST3040). At this point, with propagation path determining section 131 stopped, frequency selecting section 113 holds the switch state (maintains the current state).

Next, data type determining section 302 determines QoS (Quality of Service) of received data, namely, data type (ST3050). Then, when the received data is speech data, streaming data or the like (ST3060), data type determining section 302 stops ACK/NACK signal transmission (ST3070). And then, the processing flow returns to ST3010, and move determining section 301 monitors (measures) the moving state. On the other hand, when the received data is not speech data or the like in ST3060, the processing flow directly returns to ST3010.

Thus, according to this Embodiment, when mobile station apparatus 300 is not in a moving state, or when received data is such data that is successively transmitted, a certain predetermined circuit that does not need to operate is stopped, so that it is possible to reduce power consumption in mobile station apparatus 300.

Embodiment 4

Figure 23:
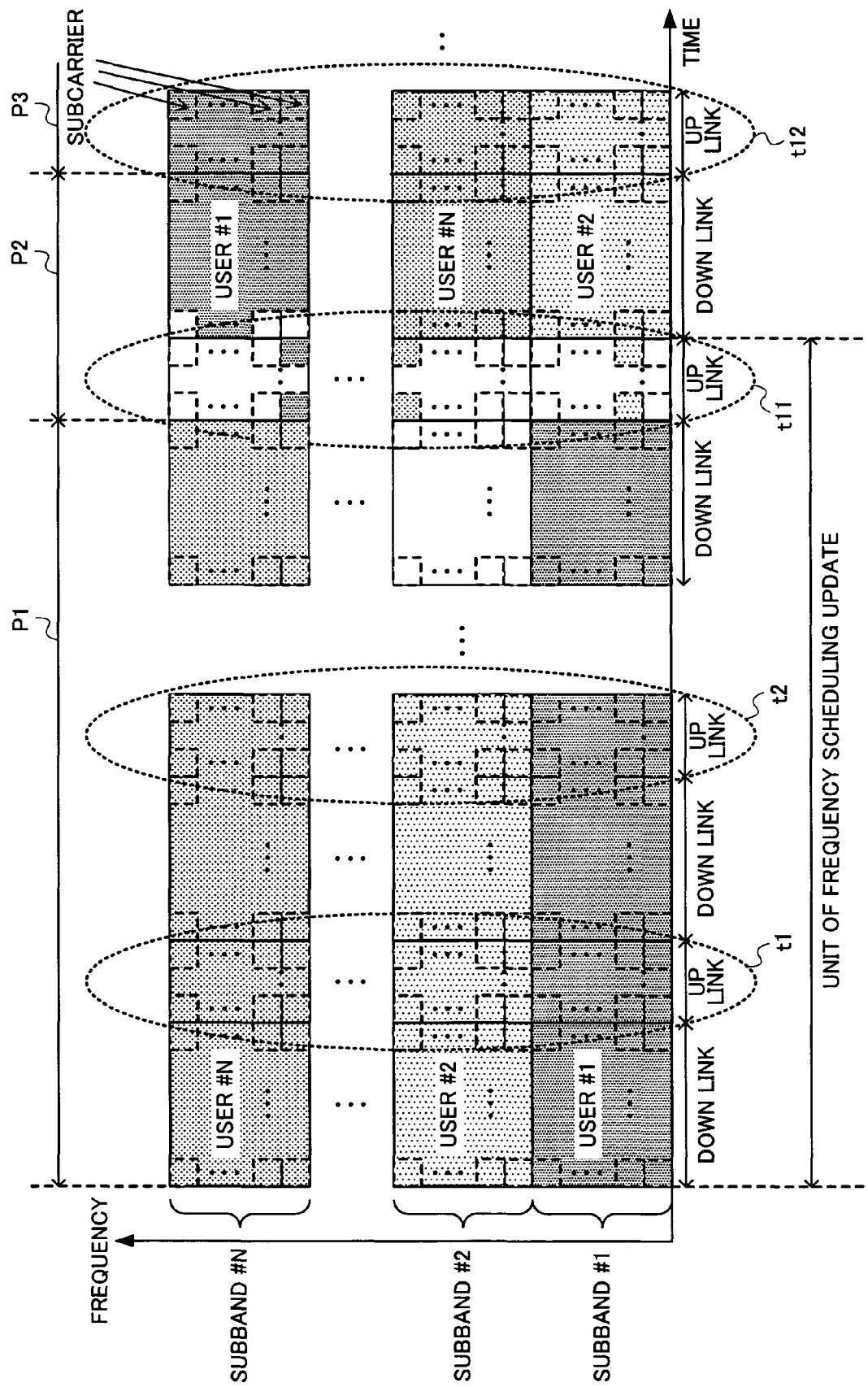
FIG. 23 is a diagram to explain a summary of a transmission/reception method according to Embodiment 4.

FIG. 23 is a diagram explaining a summary of a transmission/reception method according to Embodiment 4 of the present invention. Herein, a communication system will be explained as an example where downlink frequency scheduling is performed, and the frequency scheduling update cycle—namely, the cycle for changing subband assignment for users—and the cycle for transmitting an uplink ACK/NACK signal are different.

In this communication system, a mobile station apparatus according to this Embodiment performs uplink ACK/NACK transmission by the method described in above-mentioned Embodiment 1 only when downlink frequency scheduling is updated (period P2). Meanwhile, in time slots (uplink slots) (periods P1 and P3) except for slots at the time of frequency scheduling update, a single user occupies and uses the subband assigned by last frequency scheduling.

More specifically, a normal uplink slot configuration is employed at period P1, where user #1, user #2, ..., user #N continuously use subband #1, subband #2, ..., subband #N, respectively assigned by frequency scheduling, during period P1. For example, in time slots t1 and t2, user #1, user #2, ..., user #N transmit uplink signals respectively using subband #1, subband #2, ..., subband #N.

Then, frequency scheduling update timing—more specifically, time slot t11—is known to the mobile station apparatus and base station apparatus, and therefore, in this slot, as indicated in Embodiment 1, a user (mobile station apparatus) reports a subband having a propagation path state to the base station apparatus using the ACK/NACK signal. The base station apparatus identifies the subband used for the ACK/NACK signal of a user, and, based on this subband information, performs frequency scheduling, namely, a subband assignment to the user. In other words, the transmission/reception method described in Embodiment 1 is applied at period P2. For example, a propagation path state may be determined using the average value of propagation path estimation values at the entire period P1 or the like, or a propagation path estimation value a ta specific period within period P1.

At period P3, users perform communication according to the subband assignment determined at period P2. Here, an example is shown, where subband #N is assigned to user #1, subband #1 is assigned to user #2, and subband #2 is assigned to user #N.

Figure 24:
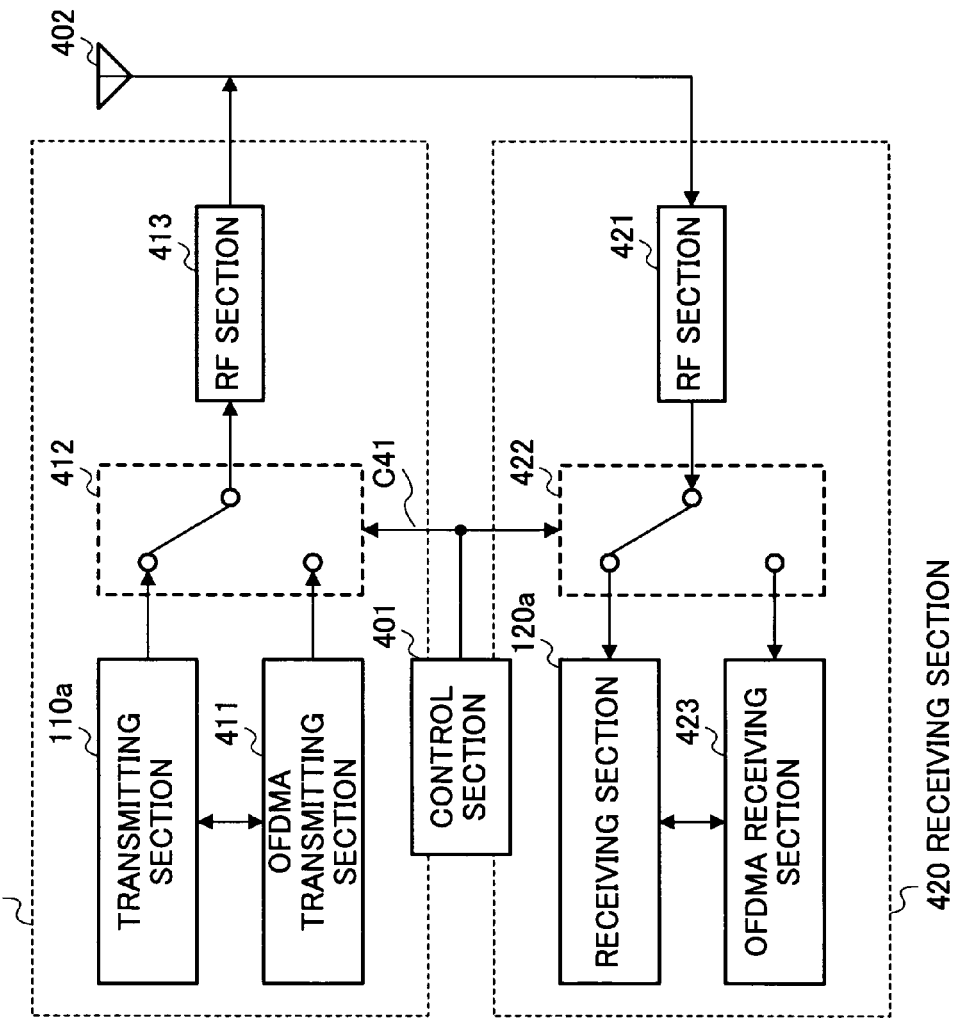
FIG. 24 is a block diagram illustrating a schematic configuration of a mobile station apparatus according to Embodiment 4.
Figure 25:
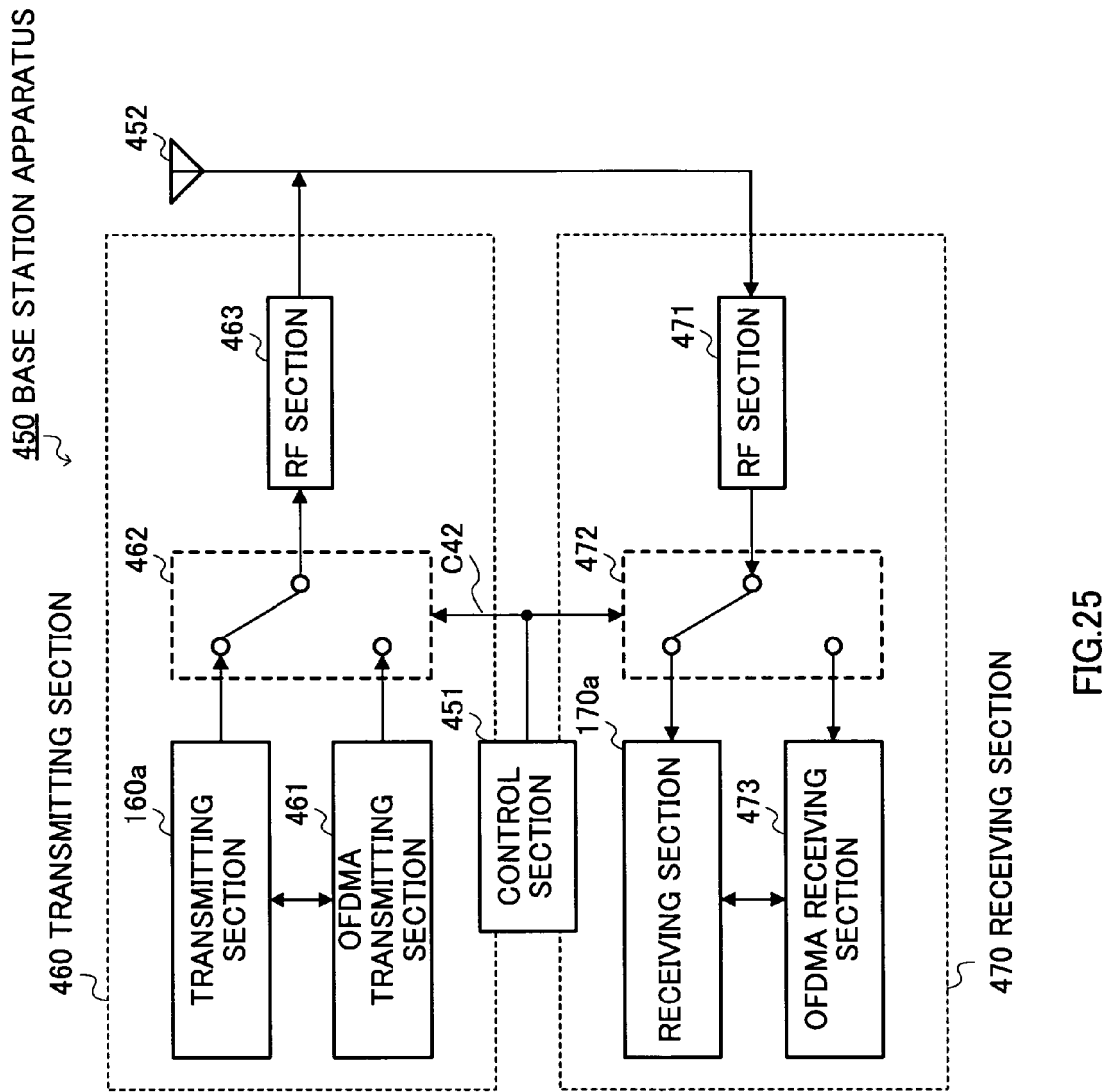
FIG. 25 is a block diagram illustrating a schematic configuration of a base station apparatus according to Embodiment 4.

FIGS. 24 and 25 are block diagrams respectively illustrating schematic configurations of mobile station apparatus 400 and base station apparatus 450 according to this Embodiment to implement the above-mentioned operation. In addition, mobile station apparatus 400 and base station apparatus 450 have the same configurations.

More specifically, in mobile station apparatus 400, OFDM transmitting and receiving sections 411 and 423 for performing normal OFDM transmission and reception and transmitting and receiving sections 110 and 120 described in Embodiment 1, are switched according to the frequency scheduling update cycle. In base station apparatus 450, OFDM transmitting and receiving sections 461 and 473 for performing normal OFDM transmission and reception, and transmitting and receiving sections 160 and 170 described in Embodiment 1 are switched according to the frequency scheduling update cycle. Transmitting and receiving sections 110, 120, 160 and 170 do not have the RF section, antenna and the like shared with OFDMA transmitting and receiving sections 411, 413, 461 and 473, and are shown as transmitting and receiving section 110a, 120a, 160a and 170a in the figures.

Further, the above-mentioned switching operation is performed by control section 401 controlling switches 412 and 422 in mobile station apparatus 400, while being performed by control section 451 controlling switches 462 and 472 in base station apparatus 450. Descriptions on RF sections 413, 421, 463 and 471 and antennas 402 and 452 are omitted, and for ease of explanation, input and output signals are not shown in the figures.

Figure 26:
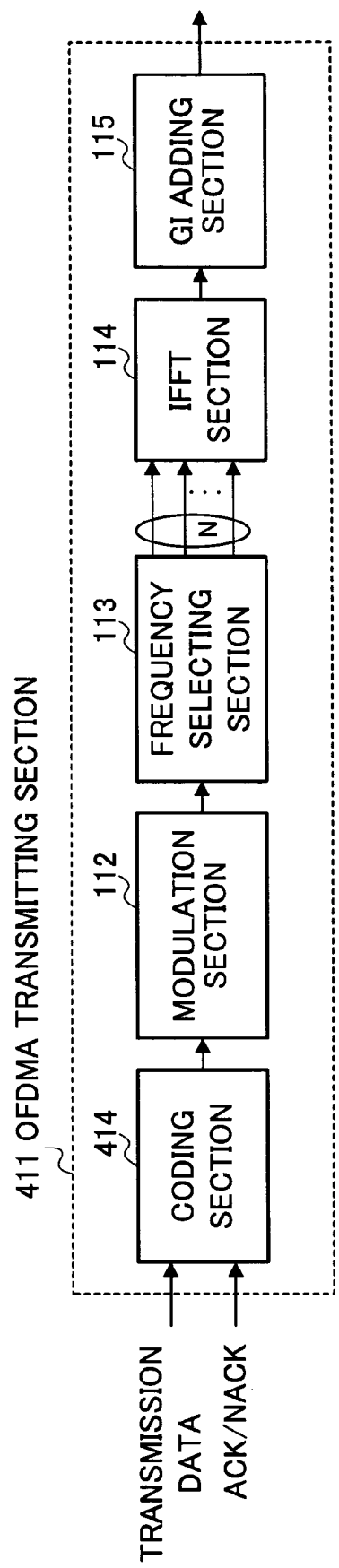
FIG. 26 is a block diagram illustrating a primary configuration of the inside of an OFDMA transmitting section of the mobile station apparatus according to Embodiment 4.
Figure 27:
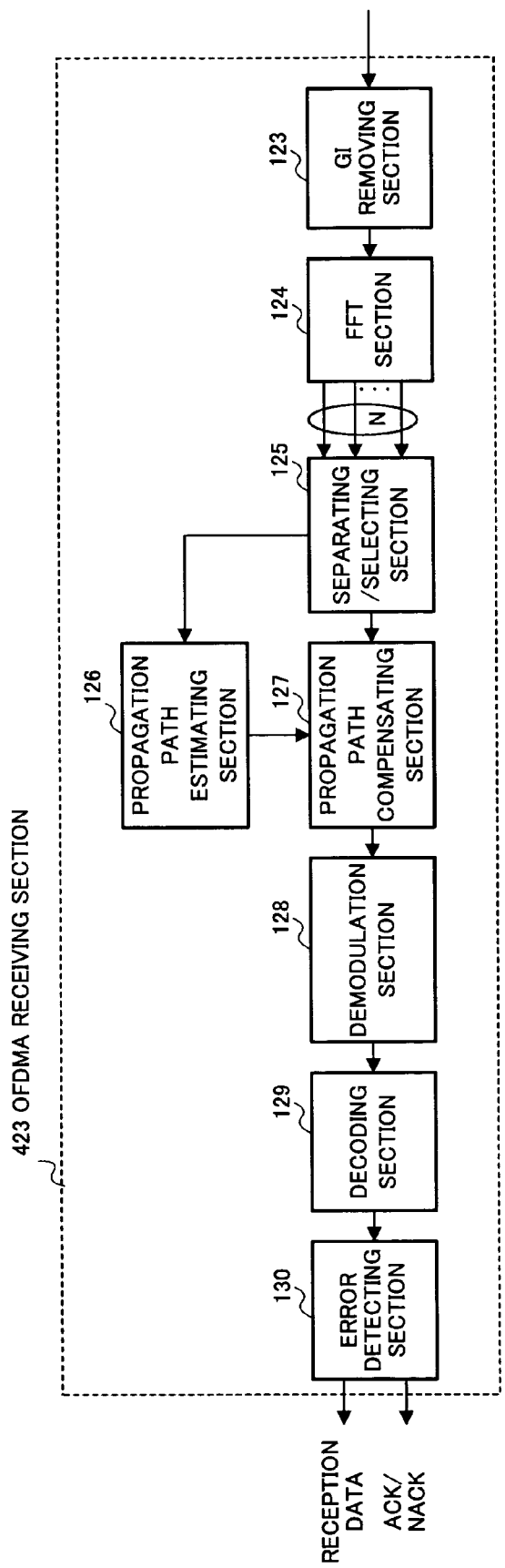
FIG. 27 is a block diagram illustrating a primary configuration of the inside of an OFDMA receiving section of the mobile station apparatus according to Embodiment 4.
Figure 28:
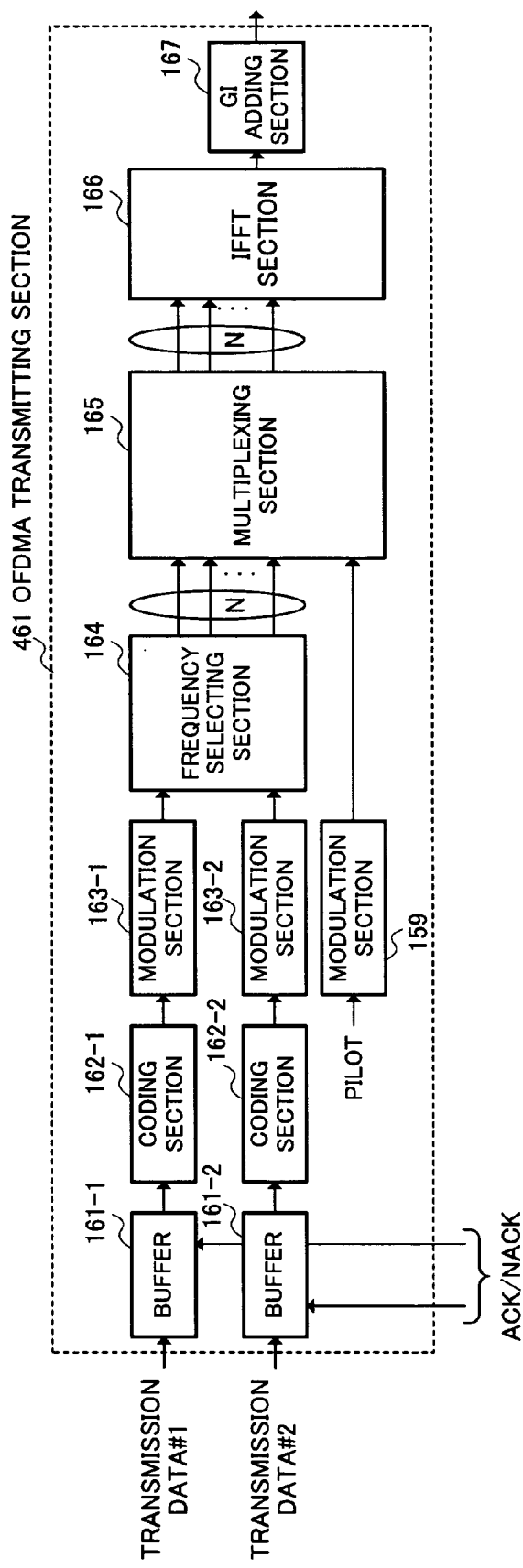
FIG. 28 is a block diagram illustrating a primary configuration of the inside of an OFDMA transmitting section of the base station apparatus according to Embodiment 4.
Figure 29:
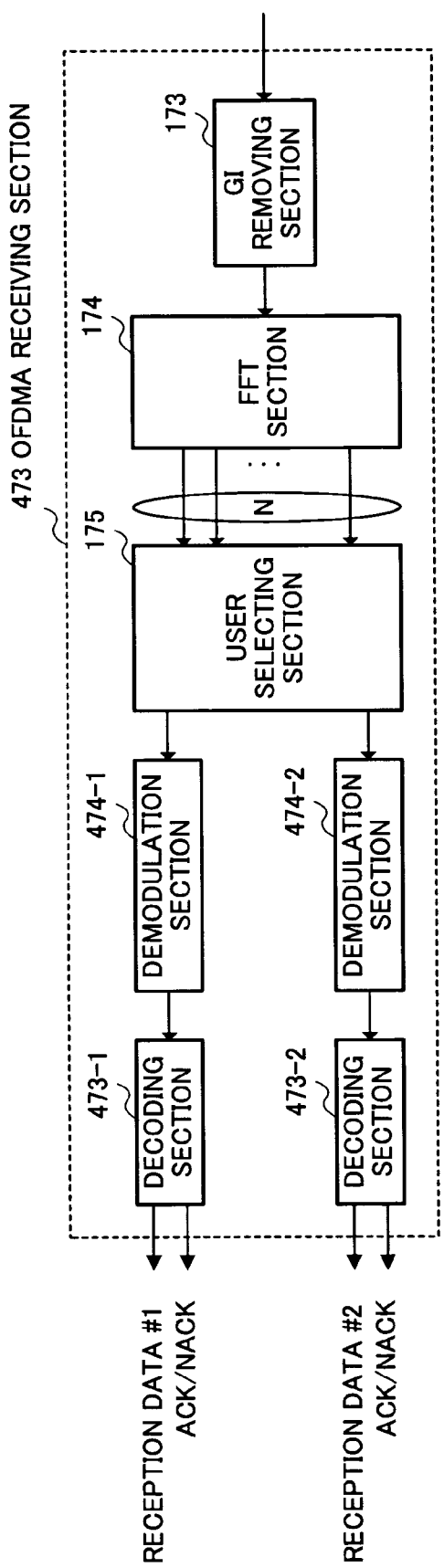
FIG. 29 is a block diagram illustrating a primary configuration of the inside of an OFDMA receiving section of the base station apparatus according to Embodiment 4.

FIGS. 26 and 27 are block diagrams respectively illustrating primary configurations inside OFDMA transmitting section 411 and OFDMA receiving section 423 in above-mentioned mobile station apparatus 400. Further, FIGS. 28 and 29 are block diagrams respectively illustrating primary configurations inside OFDMA transmitting section 461 and OFDMA receiving section 473 in above-mentioned base station apparatus 450. These apparatuses have the same basic configurations as those of transmitting sections 110, 160 and receiving sections 120, 170 described in Embodiment 1 (see FIGS. 1 and 7), the same structural elements are assigned the same reference numerals, and descriptions thereof are omitted. Further, descriptions on the coding section, demodulation section and decoding section that have typical configurations are omitted.

The operations of control section 401 in mobile station apparatus 400 and control section 451 in base station apparatus 450 will be described in detail below. Control sections 401 and 451 have the same basic operation.

After updating frequency scheduling, OFDMA transmitting section 411 and OFDMA receiving section 423 maintains updated subband assignments for users. More specifically, the subband assignment is maintained by frequency selecting section 113 in OFDMA transmitting section 411, separating/selecting section 125 in OFDMA receiving section 423, frequency selecting section 164 in OFDMA transmitting section 461, and user selecting section 175 in OFDMA receiving section 473. In addition, the frequency scheduling update cycle is a predetermined value known to both mobile station apparatus 400 and base station apparatus 450, and specified by the number of frames.

Control sections 401 and 451 switch respective switches according to internal counters. Control section 401 will be described as an example. More specifically, control section 401 increments a frame number measuring counter by "1" per radio frame, and, when the counter value becomes equal to the frequency scheduling update cycle, outputs switching control signal C41 to switches 412 and 422, so that transmitting section 110a is connected to RF section 413, and receiving section 120a is connected to RF section 421. Here, the frame number measuring counter is reset. Meanwhile, when the counter value is different from the frequency scheduling update cycle, control section 401 controls so that OFDMA transmitting section 411 is connected to RF section 413 and that OFDMA receiving section 423 is connected to RF section 421 by switching control signal C41.

Thus, according to this Embodiment, in a system where the downlink frequency scheduling update cycle is different from uplink ACK/NACK transmission cycle, the uplink ACK/NACK transmission is performed by the method described in above-mentioned Embodiment 1 only when downlink frequency scheduling is updated. Accordingly, it is possible to reduce the feedback information amount for frequency scheduling and the error rate in ACK/NACK transmission.

In addition, in mobile station apparatus 400 according to this Embodiment, although a case has been described as an example where transmitting section 110a having a similar configuration to that of transmitting section 110 described in Embodiment 1 is used as a transmitting section to be paired with OFDMA transmitting section 411, this may be a configuration similar to transmitting section 210 described in Embodiment 2. Likewise, in mobile station apparatus 400 according to this Embodiment, although a case has been described as an example where receiving section 120a having a similar configuration to that of receiving section 120 described in Embodiment 1 is used as a receiving section to be paired with OFDMA receiving section 423, this configuration may be similar to receiving section 220 described in Embodiment 2 or receiving section 320 described in Embodiment 3.

Further, although a case has been described as an example with this Embodiment where one user uses one subband to perform communication, one user may use a plurality of subbands, for example, user #1 may use subbands #1 and #2 to perform communication.

The above is an explanation of the embodiments of the present invention.

The transmission/reception apparatus according to the present invention is not limited to above-mentioned Embodiments 1 to 4, and can also be implemented in various modifications. For example, Embodiments 1 to 4 are implemented in appropriate combinations.

The transmission/reception apparatus according to the present invention is usable also in communication systems using wired communications such as ADSL (Asymmetric Digital Subscriber Line) and the like, there by providing a wired communication system performing efficient frequency scheduling.

Further, although the communication system of the TDD scheme has been described here as an example, the invention is not limited this, and for example, the invention may be an FDD scheme communication system.

Furthermore, although a case has been described here where the present invention is configured with hardware, the present invention may also be implemented by software. For example, the algorithm of the reception method or transmission method according to the invention is described in programming language, and this described program is stored in memory and executed by an information processing means, so that it is possible to implement the same functions as those of the reception apparatus or transmission apparatus of the present invention.

Each function block employed in the description of each of the aforementioned embodiments may typically be implemented as an LSI constituted by an integrated circuit. These may be individual chips or partially or totally contained on a single chip.

"LSI" is employed here but this may also be referred to as "IC," "super LSI," "or "ultra LSI" depending on differing extents of integration.

Further, the method of circuit integration is not limited to LSI's, and implementation using dedicated circuitry or general purpose processor is also possible. After LSI manufacture, utilization of FPGA (Field Programmable Gate Array) or a reconfigurable processor where connections or settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application to biotechnology is also possible.

A first aspect of the reception apparatus of the present invention employs a configuration comprising: a determination section that makes a determination of a propagation path state through which a received multicarrier signal is transmitted; a specifying section that specifies a region having a propagation path state that is equal to or better than a predetermined level in a frequency band used for the received multicarrier signal, according to the determination result; and a reporting section that reports region information indicating the specified region to a transmission apparatus.

According to this configuration, only a region having a good propagation path state in the used frequency band is reported to the transmitting side, so that it is possible to reduce the data amount and improve communication system throughput. Further, power consumption can be restrained in the reception apparatus.

A second aspect of the reception apparatus of the invention employs a configuration in the above-mentioned configuration, wherein: the frequency band used for the received multicarrier signal is divided into a plurality of frequency bands known to both the transmission apparatus and the reception apparatus, the specifying section has a selection section that selects a frequency band having a propagation path state that is equal to or better than a predetermined level among the plurality of frequency bands, and the reporting section transmits a report signal via the frequency band selected by the selecting section, reports the region information to the transmission apparatus.

According to this configuration, the reception apparatus selects a subband having a propagation path state equal to or better than a predetermined level, and transmits a report signal to the transmitting side via the selected subband. Accordingly, only by identifying the subband used for the report signal (without performing processing such as decoding and the like on the report signal), the transmitting side can recognize the frequency region having good propagation path state. Further, since processing such as decoding and the like are not performed, processing delay does not occur.

A third aspect of the reception apparatus of the present invention employs a configuration in the above-mentioned configuration, wherein the report signal comprises an ACK signal or an NACK signal used for automatic repeat request control.

According to this configuration, by using the ACK/NACK signal as the report signal, the data amount can be further reduced. Moreover, the ACK or NACK signal is transmitted via the region having a good propagation path state, so that high-quality transmission becomes available.

A fourth aspect of the reception apparatus of the invention employs a configuration in the above-mentioned configuration, wherein the ACK signal and the NACK signal are distinguished by a difference in pilot patterns or transmission power.

According to this configuration, the ACK/NACK determination processing of the pilot pattern can be performed by correlation processing, pattern matching or the like. In other words, demodulation processing and decoding processing such as error correction are not needed. Accordingly, it becomes possible to reduce the processing delay and improve communication system throughput.

A fifth aspect of the reception apparatus of the invention employs a configuration in the above-mentioned configuration, wherein: the reception apparatus sets a transmission signal modulation scheme based on reception quality of the received multicarrier signal, and the report signal is modulated by a modulation scheme having a higher transmission rate than the modulation scheme set based on the reception quality.

According to this configuration, since the transmitting side transmits data using a subband having a good propagation path state, the reception quality is improved on the reception side, and for example, an MCS having a higher transmission rate can be selected in the HSDPA scheme.

A sixth aspect of the reception apparatus of the invention in the above-mentioned configuration further provides a generation section that generates additional information on the frequency band selected by the selecting section, wherein: the selecting section selects a plurality of frequency bands included in the region having the propagation path state that is equal to or better than the predetermined level; the generation section assigns priorities to the plurality of frequency bands selected by the selecting section according to the propagation path state, and includes the priorities in the additional information; and the reporting section reports the additional information in addition to the region information to the transmission apparatus.

Thus, according to this configuration, the mobile station apparatus assigns priorities to a plurality of subbands having good propagation path states on downlink, and reports the subbands to the base station apparatus, so that the base station apparatus is able to perform frequency scheduling taking into consideration the situations of a plurality of users (by making adjustments between a plurality of users). Accordingly, it is possible to improve communication system throughput.

A seventh aspect of the reception apparatus of the invention employs a configuration in the above-mentioned configuration, wherein, reporting section changes the pilot pattern or transmission power of the report signal according to the priorities assigned by the generation section, and reports the additional information to the transmission apparatus.

According to this configuration, it is possible to determine the content of the report signal without performing demodulation processing or decoding processing. Accordingly, it becomes possible to reduce the processing delay and improve communication system throughput.

An eighth aspect of the reception apparatus of the invention employs a configuration, in the above-mentioned configuration, wherein, after the region information is reported, reception processing of the received multicarrier signal is performed in the region specified by the specifying section.

According to this configuration, it is possible to reduce the reception processing and power consumption.

A ninth aspect of the reception apparatus of the invention employs a configuration, in the above-mentioned configuration further comprising: an identifying section that identifies a type of data mapped on the received multicarrier signal; and a control section that stops part of circuit for a predetermined time period when the identified data type corresponds to data that is successively transmitted from the transmission apparatus or data for which a reception error within a predetermined range is allowed.

A tenth aspect of the reception apparatus of the invention employs a configuration in the above-mentioned configuration further comprising, a determining section that determines whether or not the reception apparatus is in a static state; and a control section that stops part of circuit for a predetermined time period when the reception apparatus is determined to be in the static state.

According to this configuration, a certain predetermined circuit that does not need to operate is stopped, so that it is possible to reduce power consumption.

An eleventh aspect of the reception apparatus of the invention employs a configuration in the above-mentioned configuration, further comprising: an acquisition section that acquires the number of communication terminals in a communication system to which the reception apparatus belongs, wherein the reporting section repeats the report signal when the acquired number of communication terminals is equal to or less than a predetermined value.

A twelfth aspect of the reception apparatus of the invention employs a configuration in the above-mentioned configuration, wherein the reception apparatus is used as a communication terminal in a communication system, and the acquisition section is reported the acquired number of communication terminals from the base station of the communication system.

A thirteenth aspect of the reception apparatus of the invention employs a configuration, in the above-mentioned configuration, wherein the determining section performs one of estimation of the propagation path fluctuation of the received multicarrier signal and reception quality measurement of the received multicarrier signal to determine the propagation path state of the received multicarrier signal.

A fourteenth aspect of the reception apparatus of the invention employs a configuration in the above-mentioned configuration, wherein a plurality of subcarrier signals included in the frequency band are assigned to the reception apparatus and other reception apparatuses in advance.

A fifteenth aspect of the reception apparatus of the invention employs a configuration in the above-mentioned configuration, wherein the report signal is subjected to code division multiplexing.

A first aspect of the transmission apparatus of the invention employs a configuration comprising: an acquisition section that acquires from the reception apparatus, frequency band information indicating a frequency band having a propagation path state that is equal to or better than a predetermined level among a plurality of frequency bands, into which a frequency band used for a transmission multicarrier signal is divided and which are known to both the transmission apparatus and a reception apparatus; and a transmitting section that transmits a signal to the reception apparatus via the frequency band indicated by the frequency band information.

A second aspect of the transmission apparatus of the invention employs a configuration, in the above-mentioned configuration, wherein the acquisition section comprising: an identifying section that identifies the frequency band through which a signal is transmitted from the reception apparatus; and a judging section that judges that the identified frequency band is the frequency band having the propagation path state that is equal to or better than the predetermined level.

A third aspect of the transmission apparatus of the invention employs a configuration, in the above-mentioned configuration, wherein the transmission apparatus is used as a base station accommodating a plurality of mobile terminals, the acquisition section acquires a priority of the propagation path state of the frequency band in addition to the frequency band information from each communication terminal, and the transmitting section determines a frequency band to assign to a signal to each communication terminal based on the frequency band information and the priority of the propagation path state of the frequency band.

A fourth aspect of the transmission apparatus of the invention employs a configuration, in the above-mentioned configuration, wherein the transmitting section reports the frequency band determined by frequency scheduling to each communication terminal before transmitting a signal.

A fifth aspect of the transmission apparatus of the invention employs a configuration, in the above-mentioned configuration, wherein the transmitting section transmits a report signal via the frequency band determined by frequency scheduling.

A sixth aspect of the transmission apparatus of the invention employs a configuration in the above-mentioned configuration, wherein the transmitting section assigns a lower frequency band in a carrier center frequency for a communication terminal with a higher priority.

A seventh aspect of the transmission apparatus of the invention employs a configuration, in the above-mentioned configuration, wherein the transmitting section instructs communication terminals on the repetition number of the frequency band information in accordance with the number of the accommodated communication terminals.

A first aspect of the reception method of the invention has the steps of: determining a propagation path state through which a received multicarrier signal is transmitted; specifying a region having a propagation path state that is equal to or better than a predetermined level in a frequency band used for the received multicarrier signal according to the determination result, and reporting region information indicating the specified region to a transmission apparatus.

In a first aspect of the transmission method of the invention, comprising the steps of: from a reception apparatus acquiring frequency band information indicating a frequency band having a propagation path state equal to or better than a predetermined level among a plurality of frequency bands, into which a frequency band used for a transmission multicarrier signal is divided and which are known to both a transmission apparatus and a reception apparatus; and transmitting a signal to the reception apparatus via the frequency band indicated by the frequency band information.

The present application is based on Japanese Patent Application No. 2004-021198, filed on Jan. 29, 2004, and Japanese Patent Application No. 2005-018149, filed on Jan. 26, 2005, the entire content of which is expressly incorporated by reference herein.

INDUSTRIAL APPLICABILITY

The transmission/reception apparatus according to the present invention has an advantage of improving system throughput, and is useful as a transmission/reception apparatus and the like used in an OFDMA communication system.

FIG.1 FIG.13 FIG.21 FIG.24 FIG.26 FIG.27
100 MOBILE STATION APPARATUS
110 TRANSMITTING SECTION
111 PILOT SELECTING SECTION 111
112 MODULATION SECTION
TRANSMISSION DATA
113 FREQUENCY SELECTING SECTION
114 IFFT SECTION
115 GI ADDING SECTION
116 RF SECTION
120 RECEIVING SECTION
122 RF SECTION
123 GI REMOVING SECTION
124 FFT SECTION
125 SEPARATING/SELECTING SECTION
126 PROPAGATION PATH ESTIMATING SECTION
127 PROPAGATION PATH COMPENSATING SECTION
128 DEMODULATION SECTION
129 DECODING SECTION
130 ERROR DETECTING SECTION

RECEPTION DATA
131 PROPAGATION PATH DETERMINING SECTION
FIG.2A FIG.2B
RECEPTION LEVEL
SUBBAND
FREQUENCY
ALL BANDS
SELECT THIS BAND
FIG.3A FIG.3B
SUBCARRIER NUMBER
FREQUENCY
SUBBAND #1
SUBBAND #2
FIG.4
SUBCARRIER NUMBER
SUBBAND
FREQUENCY
FIG.5
113 FREQUENCY SELECTING SECTION
114 IFFT SECTION
FROM MODULATION SECTION 112
FROM PROPAGATION PATH DETERMINING SECTION 131
FIG.6
MOBILE STATION APPARATUS 100
BASE STATION APPARATUS 150
DATA
ST1020 PROPAGATION PATH DETERMINATION
ST1030 SUBBAND SELECTION
ST1050 FREQUENCY SCHEDULING (DETERMINATION OF SUBBAND)
ST1070 RECEPTION PROCESSING
FIG.7 FIG.25 FIG.28
150 BASE STATION APPARATUS
160 TRANSMITTING SECTION
161-1 161-2 BUFFER
DATA
162-1 162-2 CODING SECTION
163-1 163-2 MODULATION SECTION
164 FREQUENCY SELECTING SECTION
165 MULTIPLEXING SECTION
166 IFFT SECTION
167 GI ADDING SECTION
168 RF SECTION
170 RECEIVING SECTION
172 RF SECTION
173 GI REMOVING SECTION
174 FFT SECTION
175 USER SELECTING SECTION
176-1 176-2 DETERMINING SECTION
FIG.8
FREQUENCY
SUBCARRIER BLOCK
TIME
UPLINK
DOWNLINK
FIG.9
174 FFT SECTION
175 USER SELECTING SECTION
176-1 176-2 DETERMINING SECTION
183-1 DETECTING SECTION
TO FREQUENCY SELECTING SECTION 164
FIG.10
163-1 163-2 MODULATION SECTION
164 FREQUENCY SELECTING SECTION
FROM USER SELECTING SECTION 175
165 MULTIPLEXING SECTION
MODULATED PILOT SIGNAL
FIG.11
SUBCARRIER NUMBER
SUBBAND
FREQUENCY
FIG.12
SUBCARRIER NUMBER
FIG.13
200 MOBILE STATION APPARATUS
210 TRANSIMITTING SECTON
211 PILOT SELECTING SECTION
212 MODULATION SECTION
TRANSMISSION DATA
213 FREQUENCY SELECTING SECTION
220 RECEIVING SECTION
231 PROPAGATION PATH DETERMINING SECTION
FIG.14A FIG.14B
RECEPTION LEVEL
SUBBAND
ALL BAND
SELECT THIS BAND WITH A FIRST PRIORITY
SELECT THIS BAND WITH A SECOND PRIORITY
FIG.15
FIRST PRIORITY
SECOND PRIORITY
FIG.16
114 IFFT SECTION
213 FREQUENCY SELECTING SECTION
FROM MODULATION SECTION 212
FROM PROPAGATION PATH DETERMINING SECTION 231
FIG.17
174 FFT SECTION
175a USER SELECTING SECTION
176-1 176-2 DETERMINING SECTION
283-1 DETECTING SECTION
TO FREQUENCY SELECTING SECTION 164a
FIG.18
163-1 163-2 MODULATION SECTION
164a FREQUENCY SELECTING SECTION
165 MULTIPLEXING SECTION
MODULATED PILOT SIGNAL
255 ADJUSTING SECTION
FROM USER SELECTING SECTION 175a
FIG.19
START
ST2010 SB2 OF U1 COMPETES WITH OTHERS?
ST2020 SB2 IS ALREADY USED?
ST2030 ASSIGN SB1 TO U1 AND SB2 TO U2
ST2040 ASSIGN SB2 TO U1 AND SB1 TO U2
ST2050 ASSIGN SB1 TO U1 AND SB2 TO U2
END
FIG.20
SUBBAND NUMBER OF THE FIRST PRIORITY
SUBBAND NUMBER OF THE SECOND PRIORITY
SUBBAND NUMBER OF THE THIRD PRIORITY
PRIORITY INFORMATION OF USER #1
PRIORITY INFORMATION OF USER #2
PRIORITY INFORMATION OF USER #3
SELECTED SUBBAND NUMBER
UNAVAILABLE SUBBAND NUMBER DUE TO BEING SECECTED BY ANOTHER USER
UNNECESSARY SUBBAND NUMBER SINCE THE SUBBAND WITH A HIGHER PRIORITY HAS BEEN SELECTED

FIG.21
300 MOBILE STATION APPARATUS
301 MOVE DETERMINING SECTION
302 DATA TYPE DETERMINING SECTION
320 RECEIVING SECTION
FIG.22
START
ST3010 MEASURE A MOVING STATE OF A MOBILE STATION APPARATUS
ST3020 IN A STATIC STATE ?
ST3030 NORMAL OPERATION
ST3040 1 STOP PROPAGATION PATH DETERMINING SECTION
2 FREQUENCY SELECTING SECTION HOLDS THE SWITCH STATE
ST3050 DETERMINES QoS
ST3060 SPEECH DATA AND THE LIKE ?
ST3070 STOP TRANSMISSION OF ACK/NACK
FIG.23
FREQUENCY
SUBBAND
USER
SUBCARRIER
TIME
UNIT OF FREQUENCY SCHEDULING UPDATE
FIG.24
400 MOBILE STATION APPARATUS
401 CONTROL SECTION
410 TRANSMITTING SECTION
411 OFDMA TRANSMITTING SECTION
413 RF SECTION
420 RECEIVING SECTION
421 RF SECTION
423 OFDMA RECEIVING SECTION
FIG.25
450 BASE STATION APPARATUS
451 CONTROL SECTION
460 TRANSMITTING SECTION
461 OFDMA TRANSMITTING SECTION
463 RF SECTION)
470 RECEIVING SECTION
471 RF SECTION
473 OFDMA RECEIVING SECTION
FIG.26
411 OFDMA TRANSMITTING SECTION
414 CODING SECTION
TRANSMISSION DATA
FIG.27
423 OFDMA RECEIVING SECTION
RECEPTION DATA
FIG.28
461 OFDMA TRANSMITTING SECTION
TRANSMISSION DATA
FIG.29
473 OFDMA RECEIVING SECTION
RECEPTION DATA
RECEPTION DATA
473-1 473-2 DECODING SECTION
474-1 474-2 DEMODULATION SECTION

The invention claimed is:

1. A base station apparatus comprising:
an acquisition section that acquires from a communication terminal apparatus, frequency band information indicating a frequency band having a propagation path state that is equal to or better than a predetermined level among a plurality of frequency bands, into which a frequency band used for a transmission multicarrier signal is divided and which are known to both the base station apparatus and the communication terminal apparatus; and
a transmitting section that transmits a signal to the communication terminal apparatus via the frequency band indicated by the frequency band information, wherein:
the transmitting section sets a repetition number of the frequency band information in accordance with a number of accommodated communication terminal apparatuses and instructs each of a plurality of communication terminal apparatuses on the repetition number.

2. The base station apparatus according to claim 1, wherein the acquisition section comprises:
an identifying section that identifies the frequency band through which a signal is transmitted from the communication terminal apparatus; and
a judging section that judges that the identified frequency band is the frequency band having the propagation path state that is equal to or better than the predetermined level.

3. The base station apparatus according to claim 1, wherein:
the acquisition section acquires a priority of the propagation path state of the frequency band in addition to the frequency band information from each of the plurality of communication terminal apparatuses; and
the transmitting section determines a frequency band to assign to a signal for each communication terminal apparatus based on the frequency band information and the priority of the propagation path state of the frequency band.

4. The base station apparatus according to claim 3, wherein the transmitting section reports the determined frequency band to each communication terminal apparatus before transmitting a signal to each communication terminal apparatus.

5. The base station apparatus according to claim 4, wherein the transmitting section transmits the report signal via the determined frequency band.

6. The base station apparatus according to claim 3, wherein the transmitting section assigns a lower frequency band in a carrier center frequency for a communication terminal apparatus having a higher priority.

7. The base station apparatus according to claim 1, wherein the acquisition section performs the acquiring when updating the frequency band assigned to the communication terminal apparatuses.

8. A transmission method in a base station apparatus, the method comprising:
from a communication terminal apparatus, acquiring frequency band information indicating a frequency band having a propagation path state equal to or better than a predetermined level among a plurality of frequency bands, into which a frequency band used for a transmission multicarrier signal is divided and which are known to both the base station apparatus and the communication terminal apparatus; and
transmitting a signal to the communication terminal apparatus via the frequency band indicated by the frequency band information, wherein:
the transmitting comprises setting a repetition number of the frequency band information in accordance with the number of accommodated communication terminal apparatuses and instructing each of a plurality of communication terminal apparatuses on the repetition number.

* * * * *